US012510156B2

(12) United States Patent
Sievert et al.

(10) Patent No.: US 12,510,156 B2
(45) Date of Patent: Dec. 30, 2025

(54) FITTING FOR THROUGH-WALL PENETRATION OF A COMPOSITE VESSEL

(71) Applicant: Parker-Hannifin Corporation, Cleveland, OH (US)

(72) Inventors: Brad G. Sievert, LeHigh Acres, FL (US); Matthew D. Alfond, Ashby, MA (US); Eric Pennell, Ashby, MA (US); Jerald S. Brownell, Naples, FL (US)

(73) Assignee: Parker-Hannifin Corporation, Cleveland, OH (US)

( * ) Notice: Subject to any disclaimer, the term of this patent is extended or adjusted under 35 U.S.C. 154(b) by 149 days.

(21) Appl. No.: 18/042,043

(22) PCT Filed: Nov. 15, 2021

(86) PCT No.: PCT/US2021/059319
§ 371 (c)(1),
(2) Date: Feb. 17, 2023

(87) PCT Pub. No.: WO2022/108863
PCT Pub. Date: May 27, 2022

(65) Prior Publication Data
US 2024/0026973 A1 Jan. 25, 2024

Related U.S. Application Data

(60) Provisional application No. 63/196,460, filed on Jun. 3, 2021, provisional application No. 63/115,074, filed on Nov. 18, 2020.

(51) Int. Cl.
F16J 13/12 (2006.01)
F16J 13/02 (2006.01)

(52) U.S. Cl.
CPC ............... F16J 13/12 (2013.01); F16J 13/02 (2013.01)

(58) Field of Classification Search
USPC .............................................. 220/DIG. 4, 4.13
See application file for complete search history.

(56) References Cited

U.S. PATENT DOCUMENTS 2,943,870 A * 7/1960 Davis ........................ F16L 5/00
285/200
7,712,790 B2 * 5/2010 Descutner ............. B65D 90/00
285/205

(Continued)

FOREIGN PATENT DOCUMENTS

| CN | 105000191 B | 11/2017 |
| DE | 102011120041 A1 | 6/2013 |
| FR | 2962782 A1 | 1/2012 |

OTHER PUBLICATIONS

International Search Report and Written Opinion of the International Searching Authority for corresponding International Patent Application No. PCT/US2021/059319, mailed Feb. 18, 2022.

(Continued)

Primary Examiner — Mollie Impink
(74) Attorney, Agent, or Firm — Renner, Otto, Boisselle & Sklar, LLP

(57) ABSTRACT

A composite vessel and fitting for a through-wall penetration having an exposed end grain. The fitting includes a sealing surface arrangement that seals against the composite vessel and prevents leakage of the vessel contents while protecting the end grain from exposure to internal fluid and/or external environment. The fitting includes an outer part, an inner part, and a through-wall part extending between the inner and outer parts across the penetration. An outer seal arrangement includes an outer seal having a first sealing surface that seals against the outer surface of the composite vessel to restrict environmental contaminants migrating to the end grain. An inner seal arrangement includes at least one inner seal having second and third sealing surfaces. The second sealing (Continued)

surface seals against the inner surface of the composite vessel and the third sealing surface seals a leak path or interface between the inner part and through-wall part to restrict internal fluid migrating to the end grain.

10 Claims, 11 Drawing Sheets

(56) References Cited

U.S. PATENT DOCUMENTS

| | | | | |
|---|---|---|---|---|
| 9,151,447 | B2* | 10/2015 | Strack | F17C 1/16 |
| 9,364,991 | B2 | 6/2016 | Duclos et al. | |
| 9,963,030 | B2 | 5/2018 | Kirk et al. | |
| 2006/0251343 | A1* | 11/2006 | True | B65D 88/1606 |
| | | | | 383/118 |
| 2007/0164561 | A1 | 7/2007 | Kwon et al. | |
| 2010/0032436 | A1* | 2/2010 | Gebert | B60K 15/035 |
| | | | | 220/601 |
| 2010/0122981 | A1 | 5/2010 | Sims | |
| 2011/0284562 | A1 | 11/2011 | Novak et al. | |
| 2016/0059477 | A1* | 3/2016 | Karsch | B29C 66/7392 |
| | | | | 156/242 |
| 2017/0305265 | A1* | 10/2017 | Shoji | F02M 37/00 |

OTHER PUBLICATIONS

International Preliminary Report on Patentability of the International Preliminary Examining Authority for corresponding International Patent Application No. PCT/US2021/059319, mailed Jan. 30, 2023.

* cited by examiner

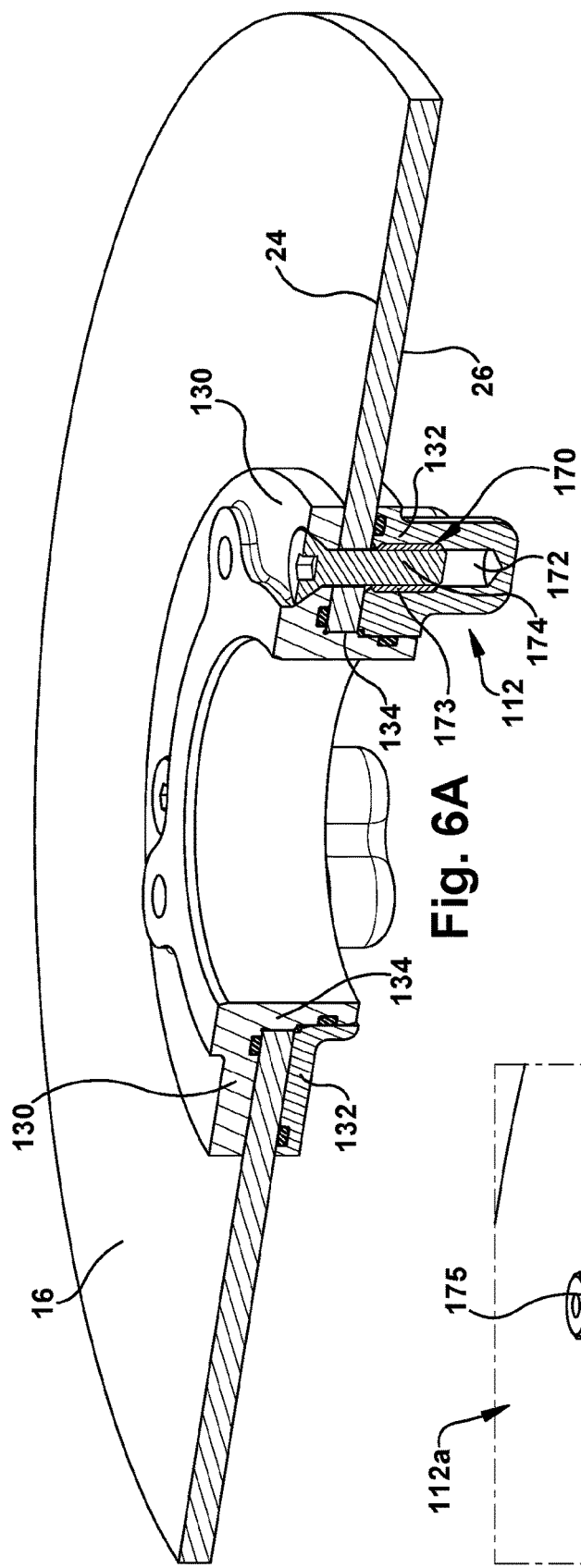
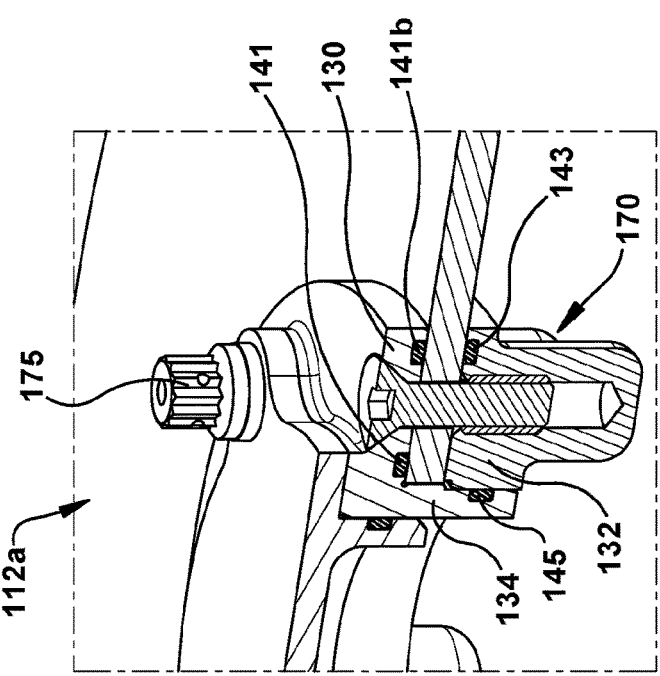

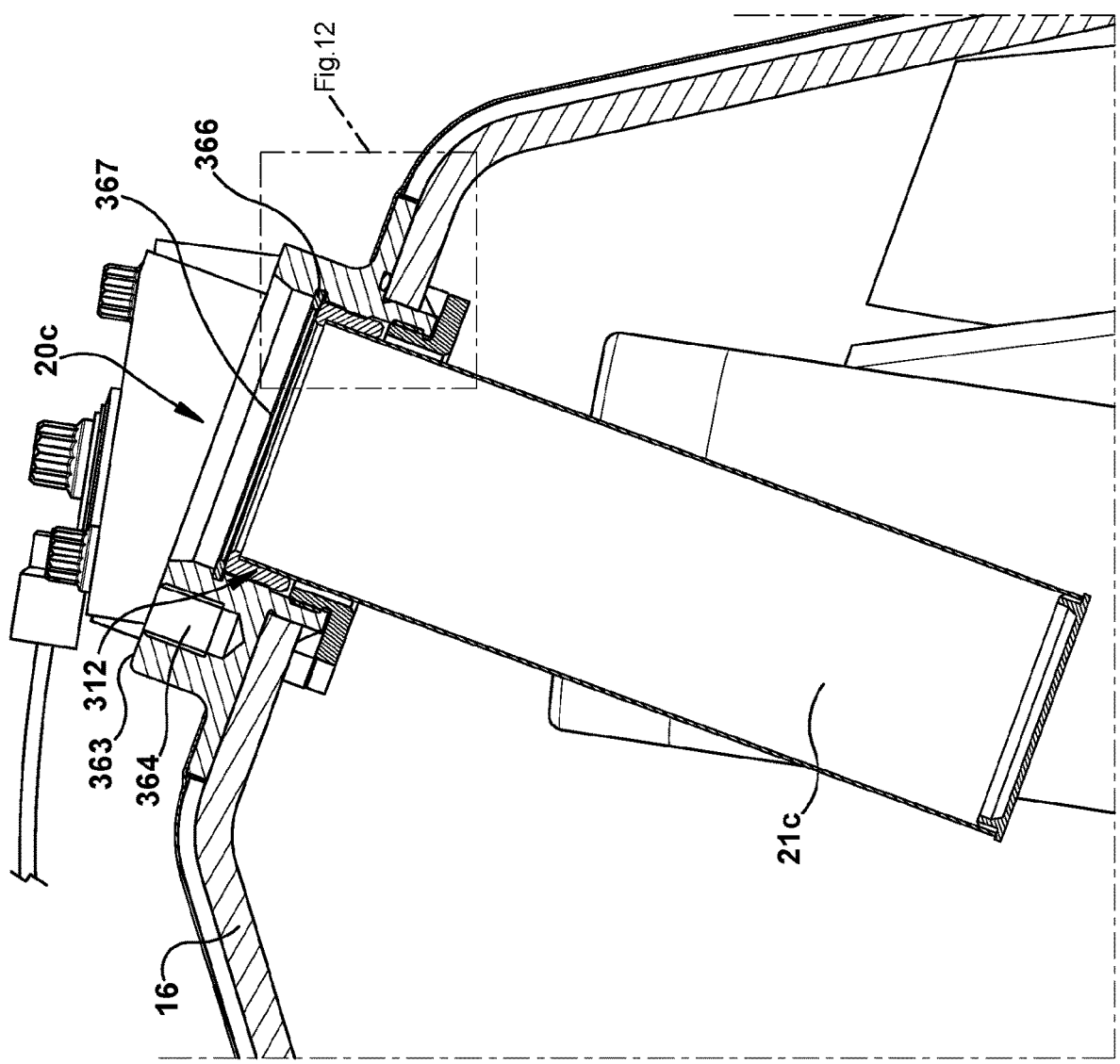

FITTING FOR THROUGH-WALL PENETRATION OF A COMPOSITE VESSEL

RELATED APPLICATIONS

This application is a national phase of International Application No. PCT/US2021/059319 filed Nov. 15, 2021, which claims the benefit of U.S. Provisional Application No. 63/196,460 filed Jun. 3, 2021, and U.S. Provisional Application No. 63/115,074 filed Nov. 18, 2020, each of which is hereby incorporated herein by reference in its entirety.

TECHNICAL FIELD

The present invention relates generally to fittings with fluid sealing functionality, and more particularly to a fitting for through-wall penetration of a composite vessel.

BACKGROUND

Vessels are used to contain fluids for a variety of applications. For example, some common uses for vessels include holding of hydraulic fluid for fluid-operated consumers, or holding of lubricant for lubricating moving parts of a machine. To provide access to the fluid in the vessel, the vessel will often contain one or more through-wall penetrations. For example, an oil tank for lubricating parts of an aircraft engine may include a separate penetration for each interfacing component of the vessel, including an oil fill port, air/oil separator, oil quality monitor, sight glass, or the like.

SUMMARY

Some vessels of the type described above use a container wall made of metal because it is durable enough to withstand more severe environmental conditions, and is typically easy to fabricate using conventional manufacturing processes. However, in the aerospace industry, for example, weight savings of such vessels is often desirable.

Accordingly, one aspect of the present disclosure provides a light-weight composite vessel for containing operating fluid of an aircraft device, such as hydraulic or lubricating oil. The composite vessel may be fabricated from a fiber-reinforced polymer-matrix composite, which has a specific strength comparable to or greater than that of metal, but which can be provided at a much lighter weight than its metal counterpart.

One problem with composite vessels, however, is that through-wall penetrations in the vessel can subject the end grain of the composite to the fluid contained in the vessel and/or to external environment conditions. This can enable the internal fluid and/or external contaminants to wick into the exposed end grain, thereby resulting in a reduction in composite strength. This problem of end grain exposure can be addressed by molding in the penetration opening, leaving the end grain covered by a resin rich layer. However, the positional accuracy that is achievable with a molding process frequently will not meet the requirements of the application.

Accordingly, another aspect of the present disclosure provides a unique fitting for a through-wall penetration of a composite fluid vessel that seals against exposure of the composite end grain to fluid in the vessel and/or to the external environment while protecting against leakage of the contents of the vessel. Such a fitting enables penetrations to be fabricated with improved positional accuracy thereby enabling proper alignment with vessel interface components. For example, such positional accuracy may be achieved by conventional machining processes, whereby the end grain becomes exposed, but is thereafter protected by the unique fitting, thereby enabling ease of fabricating such penetrations with improved accuracy and independent from a molding operation.

According to another aspect, the unique fitting disclosed herein is non-destructively removable and preferably re-installable on the composite vessel, thereby enhancing the serviceability of the fitting without affecting the overall integrity of the fitting or composite vessel itself.

According to yet another aspect, the unique fitting disclosed herein may utilize conventional O-ring seals and gland designs for improving the repairability of the fitting and minimizing overall costs compared to bespoke gasket solutions.

According to another aspect, a composite vessel fitting for a through-wall penetration with an exposed end grain of the composite vessel is provided, the fitting including a sealing surface arrangement configured to seal against the composite vessel and protect the end grain from exposure to internal fluid and/or external environment while preventing leakage of the vessel contents.

According to another aspect, a composite vessel includes: a composite wall forming an internal chamber for containing a fluid, the composite wall having at least one through-wall penetration and an exposed end grain at the through-wall penetration; and the composite vessel fitting according to any of the foregoing secured to the composite wall at the through-wall penetration, in which the sealing surface arrangement of the fitting sealingly engages the composite wall and protects the end grain from exposure to fluid inside of the internal chamber and/or external environment outside of the vessel.

According to another aspect, a composite vessel fitting for a through-wall penetration with an exposed end grain of the composite vessel is provided, the fitting including: an outer part configured to overlie at least a portion of an outer surface of the composite vessel; an inner part configured to overlie at least a portion of an inner surface of the composite vessel; a through-wall part configured to extend between the inner and outer parts across the penetration having the exposed end grain; an outer seal arrangement including at least one outer seal having a first sealing surface, in which the outer seal arrangement is configured to cooperate with the outer part such that the first sealing surface sealingly engages the outer surface of the composite vessel to restrict migration of environmental contaminants to the end grain of the composite vessel; and an inner seal arrangement including at least one inner seal having second and third sealing surfaces, in which the inner seal arrangement is configured to cooperate with the inner part and the through-wall part such that the second sealing surface sealingly engages the inner surface of the composite vessel and the third sealing surface seals a leak path or interface between the inner part and through-wall part, thereby restricting fluid from the vessel migrating to the end grain of the composite vessel.

According to another aspect, a fitting for a composite vessel includes: an inner portion having a central bore defined by a flanged portion and an inner face for abutting an inner surface of the vessel, the inner portion having an annular groove that houses an annular face seal that abuts and seals against the inner surface of the vessel and a first set of elongate projections adapted to receive fasteners; an outer portion having a cylindrical surface that is telescopically received by the flanged portion and an inner face for abutting an outer surface of the vessel, a first set of through holes registered with the first set of elongate projections, and a first annular groove that houses an annular face seal that abuts and seals against the outer surface of the vessel; and a seal disposed between the flanged portion and the cylindrical portion.

According to another aspect, a method of fabricating a composite vessel for containing a fluid, includes: forming a body of the composite vessel comprising a composite wall that forms an internal chamber for containing fluid; forming a penetration through the composite wall, wherein the forming the penetration exposes an end grain of the composite wall; and securing a fitting to the composite wall at the penetration, wherein the fitting includes a sealing surface arrangement, and wherein the securing the fitting seals the sealing surface arrangement such that the end grain is protected from exposure to internal fluid and/or external environment.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 6A is a cross-sectional perspective view of the fitting in FIG. 3 shown assembled to the portion of the composite vessel.

FIG. 6B is a cross-sectional perspective view of another exemplary embodiment of a similar fitting to that shown in FIG. 6A but with a greater number of seals.

FIG. 11 is a cross-sectional view of a third exemplary fitting and portion of the composite vessel shown in FIG. 1, with the corresponding interfacing component of an exemplary oil quantity monitor shown.

DETAILED DESCRIPTION

The principles and aspects according to the present disclosure have particular application to composite oil tanks in the aerospace industry, such as an aircraft engine oil tank, and more particularly to composite vessels having through-wall penetrations having an exposed end grain, and thus will be described below chiefly in this context. It is understood, however, that the principles and aspects according to the present disclosure may be applicable to other vessels for containing other types of fluids in other applications, including non-composite vessels or composite vessels without an exposed end grain, in which it may be desirable to seal an edge of the penetration, as would be understood by those having ordinary skill in the art.

Figure 1:
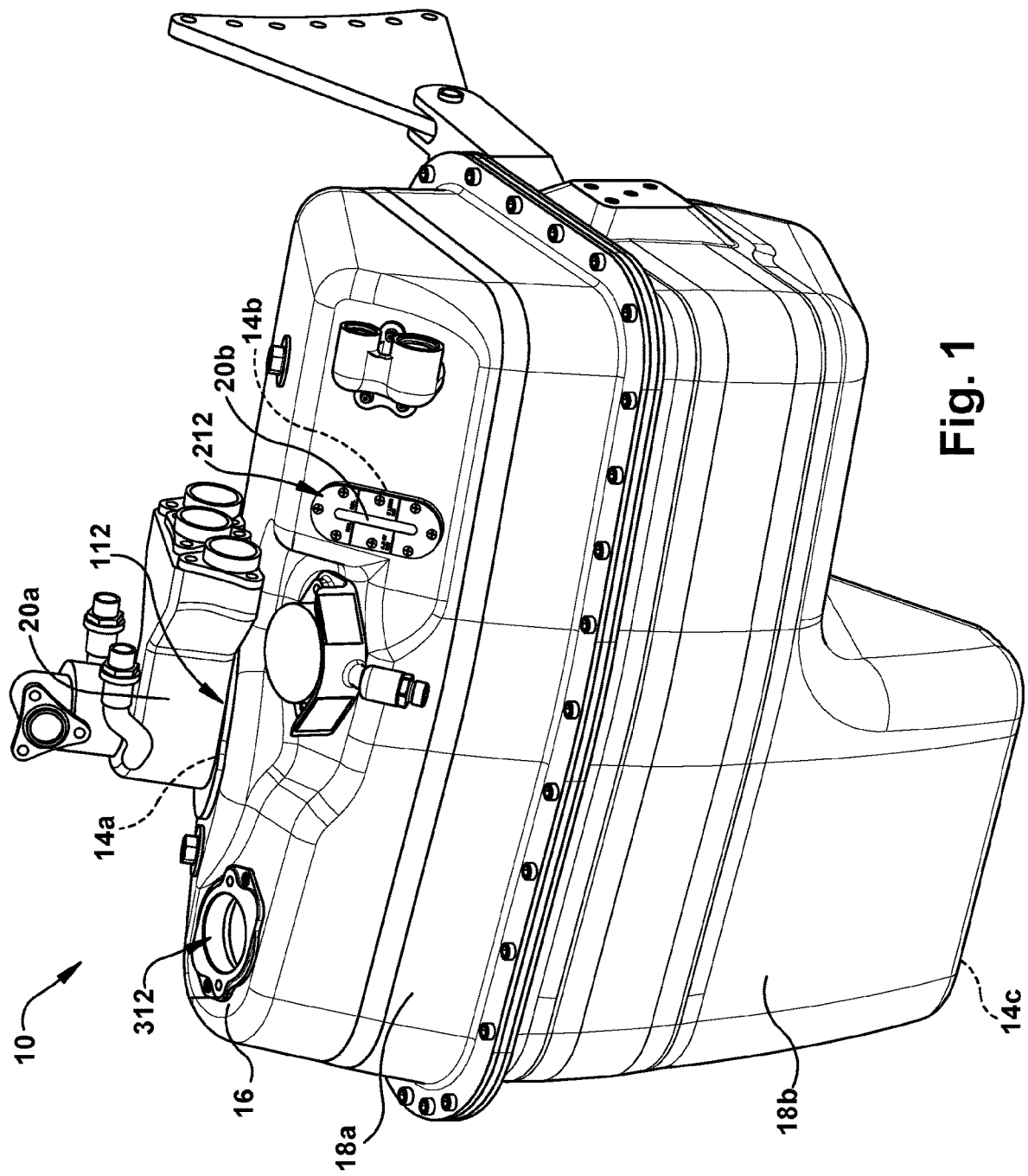
FIG. 1 is a perspective front view of an exemplary composite vessel including a plurality of exemplary fittings in respective through-wall penetrations of the vessel, and with a plurality of interfacing components shown, according to an embodiment of the present disclosure.
Figure 2:
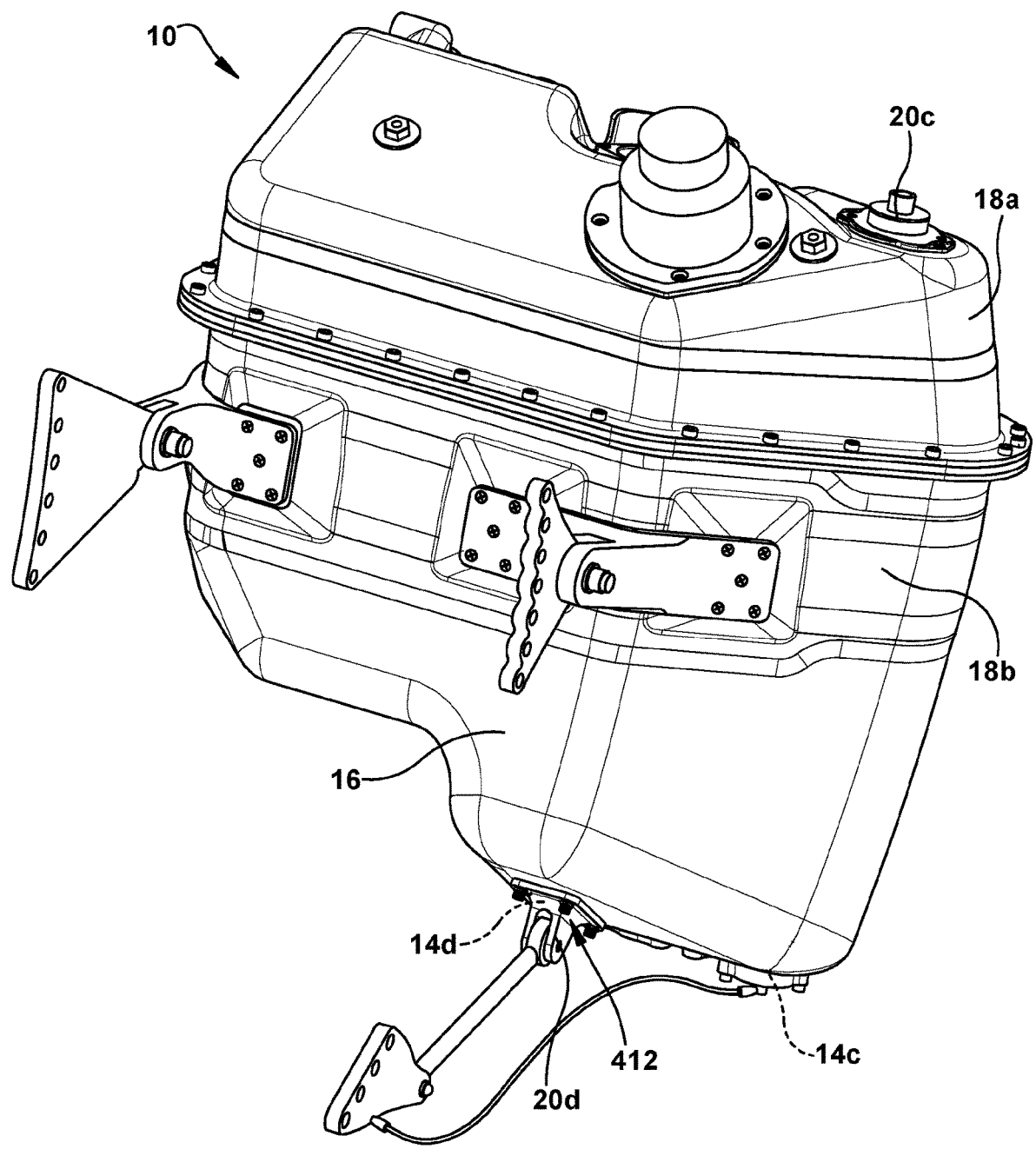
FIG. 2 is a perspective rear view of the composite vessel in FIG. 1.
Figure 3:
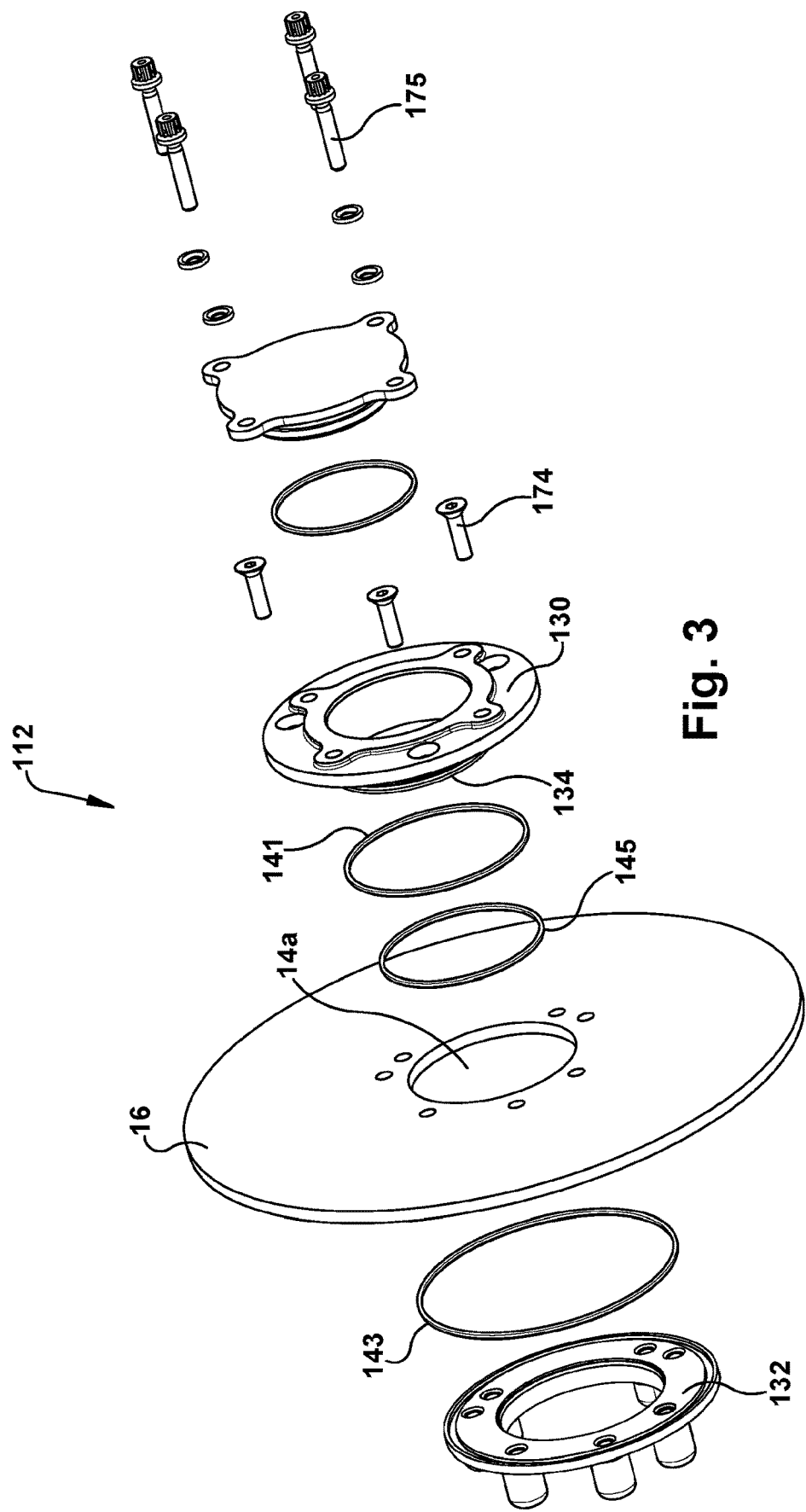
FIG. 3 is an exploded view of a first exemplary fitting and portion of the composite vessel shown in FIG. 1, but without the corresponding interfacing component of an exemplary air/oil separator shown.

Turning initially to FIGS. 1 and 2, shown is an exemplary composite vessel 10 including a plurality of exemplary fittings 112, 212, 312, 412 in respective through-wall penetrations 14a, 14b, 14c, 14d in a composite wall 16 of the vessel 10. In the illustrated embodiment, the composite vessel 10 is configured as an oil tank for an aircraft engine (not shown). The composite wall 16 forms an internal chamber of the vessel 10 for containing the engine oil. The composite wall 16 may be made with any suitable composite material, such as a fiber-reinforced polymer-matrix composite. The composite wall 16 is configured to be sufficiently strong enough to withstand normal operating conditions, preferably without the use of metal liners. The composite material may be made by any suitable process, such as via pre-pregged sheets of the material that are then stacked and bonded or cured together to provide a composite laminate structure. In the illustrated embodiment, for example, the composite wall 16 may be formed by a carbon-fiber reinforced resin-matrix material made with sheets that are conformed to the shape of the vessel and are then laminated together by curing. To facilitate manufacturing and assembly of the composite vessel 10, the composite wall 16 of the vessel may be formed in multiple parts, such as two shell halves 18a and 18b that are sealingly coupled together, as shown.

The through-wall penetrations 14a-14d in the composite wall 16 form openings in the vessel that enable access to the fluid (e.g., oil) contained therein and/or which may serve as mounting locations for interfacing components. Each penetration (collectively or generally referred to with reference number 14) may be specifically located for interfacing with a different component of the vessel, which these different components (collectively or generally referred to with reference number 20) may then interface with other components in the aircraft system. In the illustrated embodiment, for example, the composite vessel 10 includes a separate through-wall penetration 14a, 14b, 14c, 14d for each corresponding component of at least an air/oil separator 20a, a sight gage 20b, an oil outlet 20c (not shown in FIG. 1), a mounting clevis 20*d*, or the like. Each of these through-wall penetrations 14 may be adapted to have a different orientation, location or configuration depending on the interfacing component 20.

To provide improved accuracy and alignment of the penetrations 14 with the corresponding interfacing components 20, the penetrations 14 are machined through the composite wall 16 after formation of the vessel structure. Although this post-machining process provides improved accuracy and minimizes cost, the post-machining process also results in an end grain 22 of the composite material being exposed at the penetration 14 (see e.g., FIGS. 7, 8, 10, 12 and 14). More specifically, at this machined end grain 22 of the penetration 14, the fiber ends of the composite material will be exposed, which these fiber ends create pathways for the wicking of fluid or other contaminants into the composite structure. Accordingly, the internal fluid (e.g., engine oil) and/or external environment (e.g., moisture, fuel, water, deicing fluids, etc.) could migrate to the end grain 22 and wick into the composite structure. Such contamination of the composite structure could result in a reduction in composite strength and/or delamination of the composite.

To address at least the foregoing issues, the exemplary fittings 112, 212, 312, 412 are configured to seal the respective through-wall penetrations 14*a*, 14*b*, 14*c*, 14*d* against exposure of the composite end grains 22 to fluid in the vessel and/or to the external environment. To provide such sealing and protective functionality, the exemplary fittings 112, 212, 312, 412 disclosed herein utilize one or more unique sealing surface arrangements that seal against the composite vessel 10 and protect the end grains 22 at the respective penetrations 14.

In exemplary embodiments, described in further detail below, the sealing surface arrangement(s) generally include at least a first sealing surface that sealingly engages with an outer surface of the composite vessel, a second sealing surface that sealingly engages with an inner surface of the composite vessel, and a third sealing surface that sealingly engages a through-wall part of the fitting that extends through the penetration. The exemplary sealing surface arrangement may include an outer seal arrangement including at least one outer seal configured to restrict migration of environmental contaminants to the end grain of the composite, and which may also serve as a backup seal to prevent leakage of internal fluid. The exemplary sealing surface arrangement also may include at least one inner seal arrangement including at least one inner seal configured to restrict internal fluid from migrating to the end grain of the composite vessel, and which also may provide a backup seal to external contaminants entering the fluid in the vessel.

As described in the exemplary embodiments below, the fitting also includes structural parts that are configured to cooperate with the fitting sealing surface arrangement to provide a desired load (e.g., preload) that enables the sealing functionality of the fitting. For example, the fitting may generally form a clamp that is configured to exert forces on the opposite inner and outer surfaces of the composite vessel and which fluidly seals the sealing surface arrangement appropriately. In exemplary embodiments, the fitting includes at least an outer part that overlies at least a portion of an outer surface of the composite vessel, an inner part that overlies at least a portion of an inner surface of the composite vessel, and a through-wall part that extends between the inner and outer parts across the penetration having the exposed end grain. Generally, the outer fitting part may be configured to cooperate with the outer seal arrangement to fluidly seal against the outer surface of the vessel to restrict environmental migration to the end grain. The inner fitting part and the through-wall part may be configured to cooperate with the inner seal arrangement to seal against at least the inner surface of the vessel to restrict internal fluid from migrating to the end grain, and by extension, the external environment.

Generally, the respective outer, inner and through-wall parts of the fitting may be made with rigid material(s), such as suitable metal(s) (e.g., aluminum, titanium, steel, composite, molded rigid plastic, or the like), which is/are configured to withstand both the external environmental conditions and exposure to the internal fluid. The respective inner, outer, and/or through-wall parts may be formed in any manner, including machining, 3-D printing, casting, or the like. Depending on the component interface requirements, the outer part may be constructed to have a suitable interface geometry formed (e.g., machined, 3D-printed or blanked) into the part prior to assembly, or may be semi-finished to allow for final machining after assembly to minimize tolerance stack-up. In some embodiments, the fastener-receiver assemblies securing the fitting to the composite through-wall also may be used to secure the interfacing (mating) component to the fitting.

In exemplary embodiments, the outer fitting part may interface directly against the outer surface of the composite vessel, and the inner fitting part may interface directly against the inner surface of the composite vessel. The inner and outer parts may be flat or contoured to the wall profile of the vessel. These respective structural parts interfacing with the vessel wall can distribute load over an area of the composite vessel. Suitable seal housings (e.g., seal grooves or glands) may be formed in or between the inner, outer and/or through-wall parts to hold respective inner seal(s) and outer seal(s) to enable interfacing of the part while providing sealing functionality.

In exemplary embodiments, the major structural components of the fitting may be configured to be non-destructively removable and preferably re-installable on the composite vessel. This enhances the serviceability of the fitting without affecting the overall integrity of the fitting or composite vessel itself. In exemplary embodiments this is achieved using suitable fastener-receiver assemblies that provide suitable securement and loading functionality without the use of adhesives or other attachments that would require destructive removal impacting the integrity of the fitting and/or vessel. It is understood, of course, that certain parts of the fitting, such as the seals and parts of the fastener-receiver assemblies (e.g., nuts and bolts), may be replaced after each use.

Generally, the seal(s) of the sealing surface arrangement are made with suitable resilient material, such as a resilient elastomeric (e.g., nitrile, fluorocarbon, or the like as appropriate for the fluids expected in the application). The respective seal(s) generally may surround each of the respective through-wall penetrations to seal around the entire opening formed by the penetration. In exemplary embodiments, one or more, or preferably all, of the seal(s) provided by the exemplary sealing surface arrangement are standard O-ring seals. The use of standard seal designs enhances the repairability of the fitting and minimizes the overall cost to produce and repair the fitting compared to bespoke gasket designs. It is understood, however, that in some embodiments molded seals (elastomer injected and formed into the grooves in the parts) is another type of seal that could be used instead of standard O-rings.

The following description and annexed drawings set forth certain illustrative embodiments of the exemplary fittings 112, 212, 312, 412, in which similar reference numerals, but in different 100-series intervals, are used to indicate the same or similar parts in the various views. It is understood that the descriptions of each exemplary fitting 112, 212, 312, 412 may be applicable to each other, except as noted. It is also understood that aspects of the exemplary fittings 112, 212, 312, 412 may be substituted for one another or used in conjunction with one another where applicable.

Turning to FIGS. 3-6A, 7 and 8, a portion of the composite vessel 10 having through-wall penetration 14a and fitting 112 is shown in further detail. In the illustrated embodiment, the portion of the composite vessel 10 including fitting 112 is configured to interface with an air/oil separator 20a, also referred to as a deaerator/PRV assembly (also shown in FIG. 1). To facilitate alignment and mating of the air/oil separator 20a, the through-wall penetration 14a is a post-machined penetration that forms an opening through the composite wall 16, which exposes an end grain 22 of the composite. As such, the exemplary fitting 112 includes structural parts and a unique sealing surface arrangement that cooperate with each other to seal the through-wall penetration 14a against exposure of the composite end grain 22 to fluid in the vessel and/or contamination from the external environment.

In the illustrated embodiment, the exemplary structural parts of the fitting 112 include an outer part 130 that overlies at least a portion of an outer surface 24 of the composite vessel, an inner part 132 that overlies at least a portion of an inner surface 26 of the composite vessel, and a through-wall part 134 that extends between the inner part 132 and outer part 130 across the through-wall penetration 14a having the exposed end grain 22. As shown, the exemplary sealing surface arrangement of the fitting 112 includes a first sealing surface 140 that sealingly engages with the outer surface 24 of the composite vessel, a second sealing surface 142 that sealingly engages with the inner surface 26 of the composite vessel, and a third sealing surface 144 that sealingly engages with at least the through-wall part 134 of the fitting 112 that extends through the penetration 14a. In exemplary embodiments, the structural parts 130, 132, 134 of the fitting 112 generally form a clamp that exerts forces on the opposite outer and inner surfaces 24, 26 of the composite vessel 10, and applies a desired load (e.g., preload) that provides suitable sealing functionality of the sealing surfaces 140, 142, 144. As shown, one or more fastener-receiver assemblies 170 of the fitting 112 may be provided to apply the desired loads for coupling the fitting 112 to the composite wall 16 and for loading the sealing surfaces 140, 142, 144.

The exemplary sealing surface arrangement of the fitting 112 may include an outer seal arrangement and an inner seal arrangement. In the illustrated embodiment, the outer seal arrangement includes at least one outer seal 141 (first seal) having the first sealing surface 140. The outer seal 141 is disposed within an annular face seal groove 131 (first seal housing) of the outer part 130 and fluidly seals against the outer vessel surface 24. The exemplary sealing surface arrangement also includes an inner seal arrangement, which includes two inner seals 143, 145 (second and third seals) in the illustrated embodiment, which these two inner seals 143, 145 respectively include the second and third sealing surfaces 142, 144. As shown, the inner (second) seal 143 is disposed in an annular face seal groove 133 (second seal housing) of the inner part 132 and fluidly seals against the inner vessel surface 26. The other (third) inner seal 145 is disposed in a circumferential groove 135 (e.g., standard gland) (third seal housing) of the through-wall part 134 of the fitting 112 and seals against the through-wall part 134 and a portion of the inner part 132 to fluidly seal a leak path or interface between the inner part 132 and through-wall part 134.

Figure 4B:
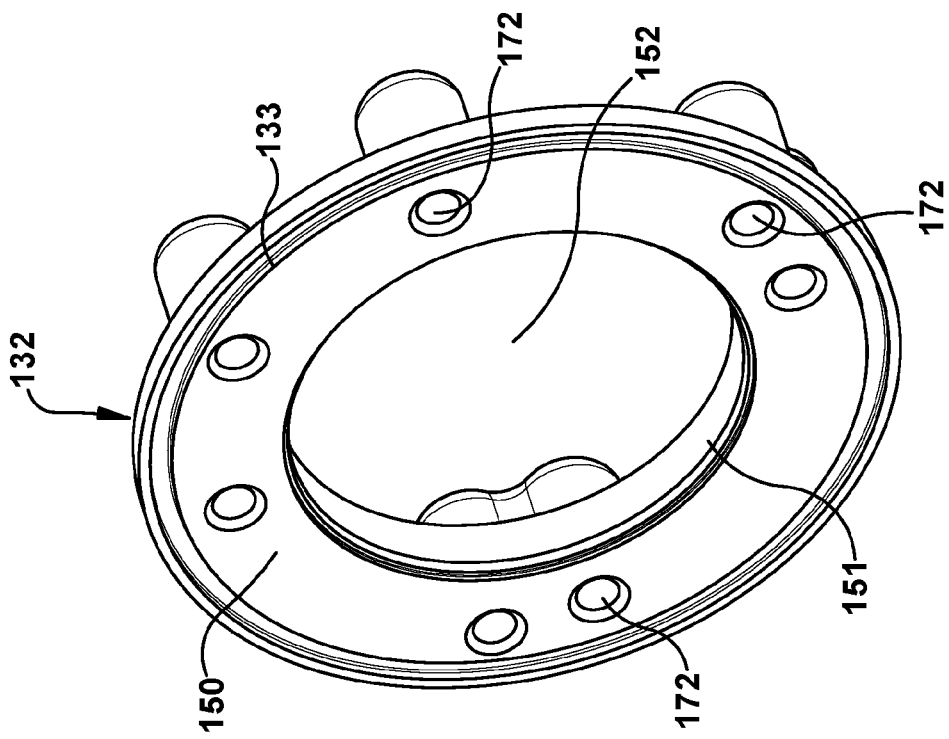
FIG. 4B is a front perspective view thereof.
Figure 4A:
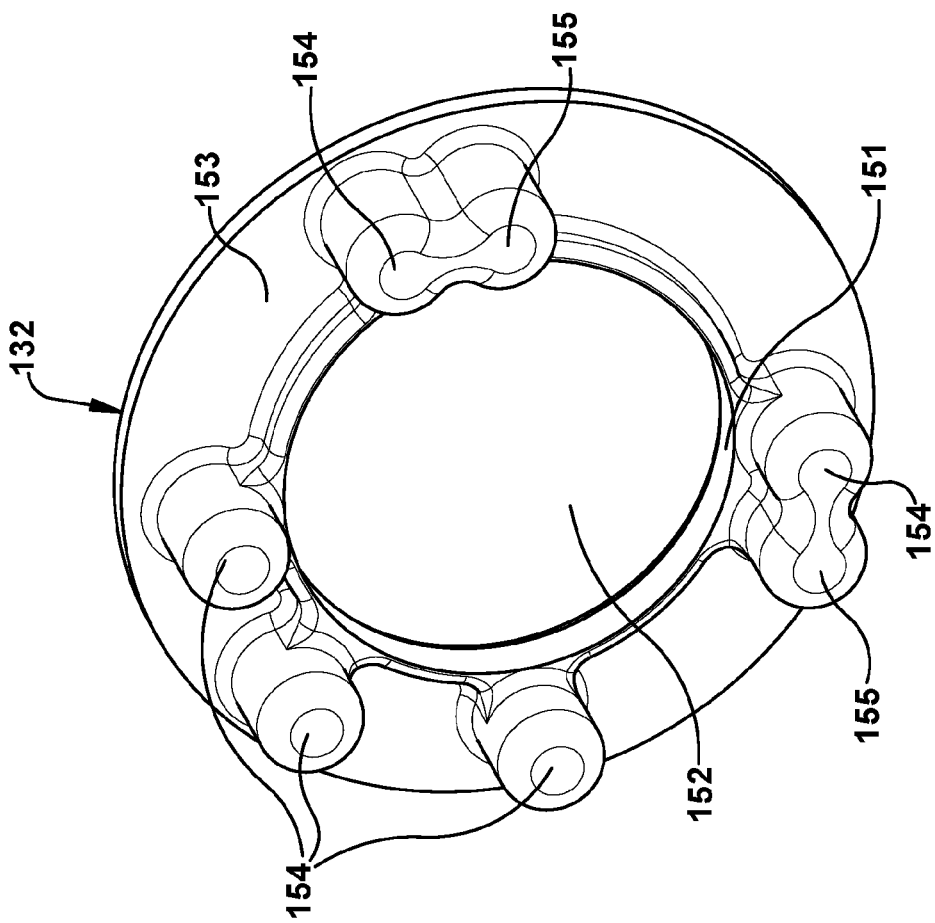
FIG. 4A is a rear perspective view of an exemplary part of the fitting shown in FIG. 3.

Referring to FIGS. 4A and 4B, the exemplary inner part 132 of the fitting is shown in further detail. The inner part 132 may be formed with a suitable material (e.g., metal, such as titanium or steel; composite; plastic; or the like), which may be made by any suitable process, such as by 3D printing or casting and machining. The inner part 132 includes a first face 150 that abuts the inner surface 26 of the vessel 10 and which includes annular groove 133 containing seal 143. An inner surface 151 forms an opening, such as a central bore 152, through the inner part 132. The inner part 132 also includes a second face 153 from which elongate projections 154 extend to form receivers 172 of respective fastener-receiver assemblies 170. In exemplary embodiments, the interior portion of the projections 154 may be drilled and tapped to form a threaded receiver 172 for receiving fasteners 174 (e.g., bolts) of the fastener-receiver assembly 170. As shown, the receivers 172 may be tapped for an insert 173 (e.g., with a HeliCoil tap) to provide the thread. Alternatively, the fastener-receiver assemblies 170 could be formed to accommodate blind rivet nuts or similar attachments. In the illustrated embodiment, the elongate projections 154 forming the receivers 172 are blind receivers enclosed at their ends to prevent exposure to the internal fluid of the vessel. As shown, the projections forming 154 the receivers 172 are a first set of receiver projections, and the inner part also may include a second set of receiver projections 155 for coupling the mating component 20a (e.g., oil/air separator 20a) to the vessel 10 with suitable fasteners 175.

Figure 5B:
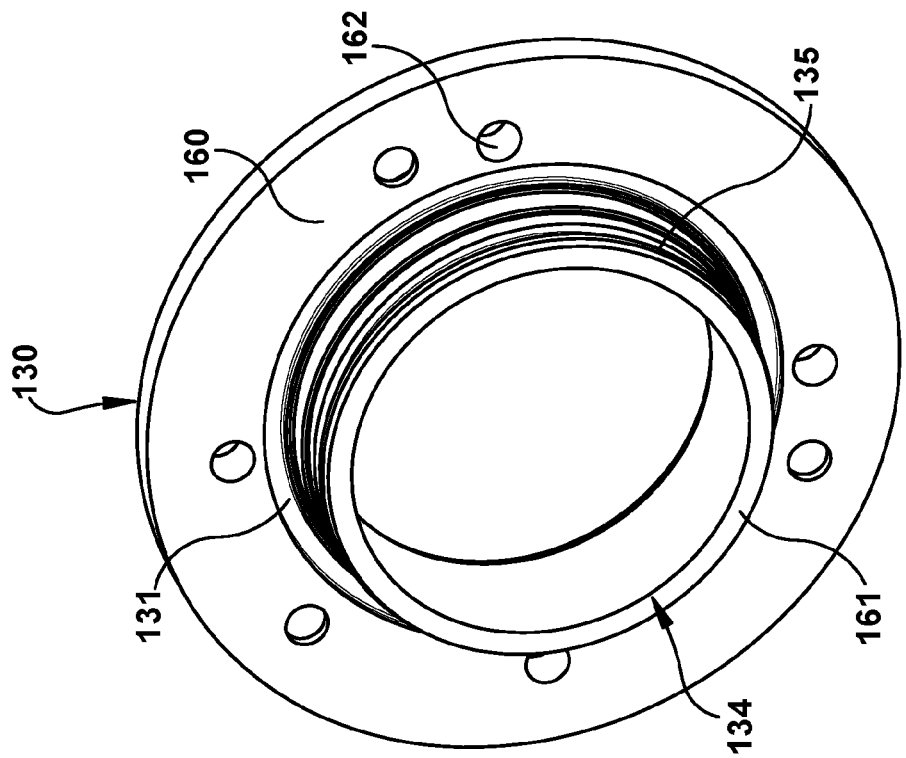
FIG. 5B is a front perspective view thereof.
Figure 5A:
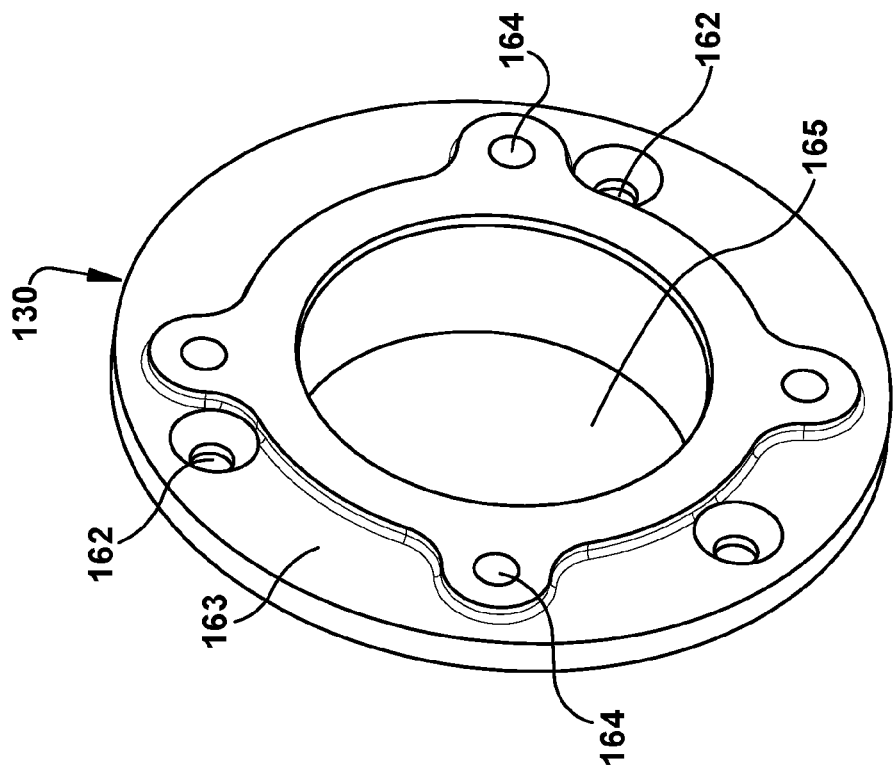
FIG. 5A is a rear perspective view of another exemplary part of the fitting shown in FIG. 3.
Figure 8:
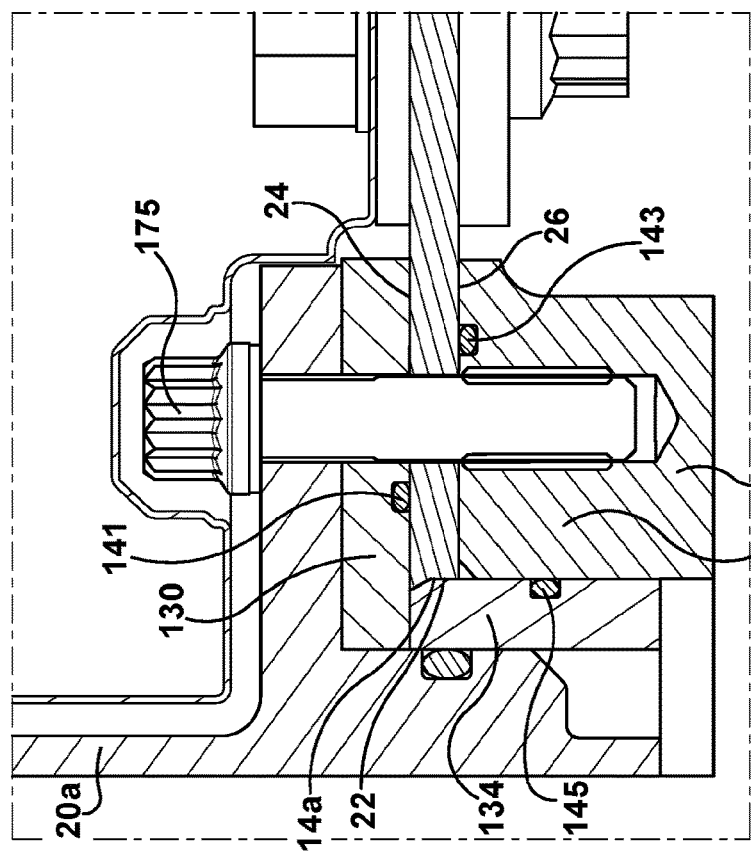
FIG. 8 is a cross-sectional view of another portion of the fitting shown in FIG. 1 and FIG. 3, with the corresponding air/oil separator interfacing component shown.
Figure 7:
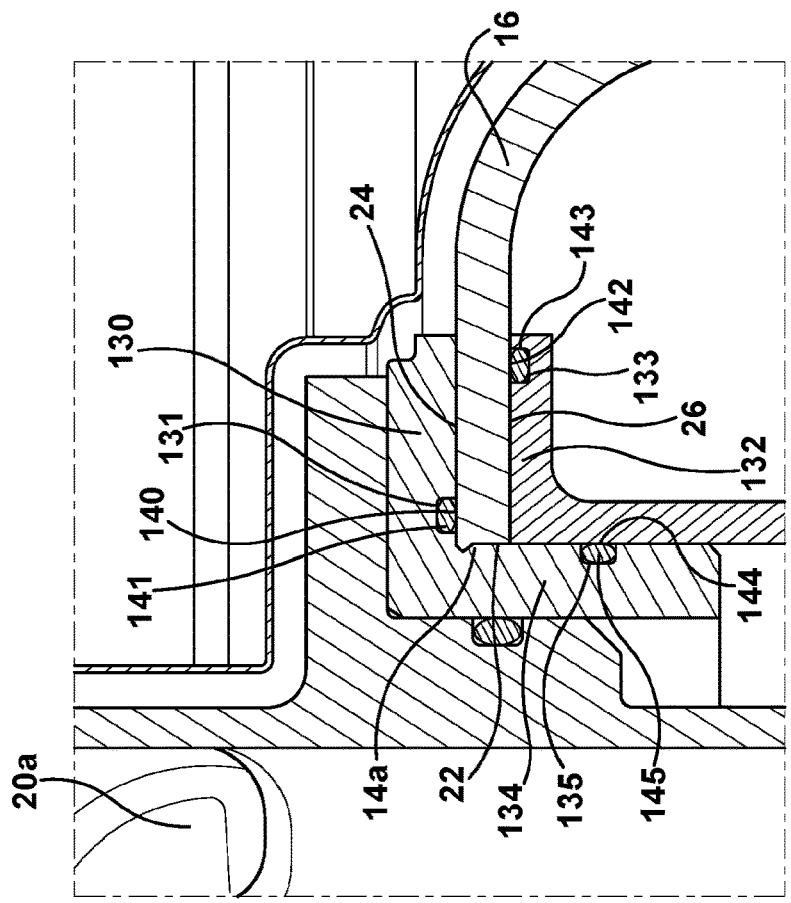
FIG. 7 is a cross-sectional view of one portion of the fitting shown in FIG. 1 and FIG. 3, with the corresponding air/oil separator interfacing component shown.

Turning to FIGS. 5A and 5B, the exemplary outer part 130 and through-wall part 134 of the fitting are shown in further detail. As shown, the outer part 130 is integral and unitary with the through-wall part 134 to form a single piece structure. This one piece structure may be formed with a suitable material (e.g., metal, such as titanium or steel; composite; plastic; or the like), which may be made by any suitable process, such as by 3D printing or casting and machining. In the illustrated embodiment, the outer part 130 includes a first face 160 that abuts the outer surface 24 of the vessel 10. The first face 160 of the outer part 130 includes annular groove 131 that houses seal 141 which surrounds the penetration 14a and seals against the outer surface 24 of the vessel 10. As shown, the outer part 130 includes a plurality of through-holes 162 with openings in a second (outer) face 163. The through-holes 162 are registered to the elongate projections 154 (i.e., receivers 172) of the inner part 132 and accommodate the fasteners 174 to secure the outer part 130 to the inner part 132 when the fitting 112 is assembled to the vessel 10. The outer part 130 also may include a second set of receivers, such as through-holes 164, which are registered to the second set of elongate projections 155 to couple the mating component (e.g., air/oil separator 20a) to the vessel 10 with fasteners 175.

As shown, the through-wall part 134 is formed as a projection 161 that projects from the first face 160 of the outer part 130 and which can be inserted into the opening (bore 152) of the inner part 132 when the fitting 112 is assembled to the vessel body. As noted above, the inner (third) seal 145 is disposed in circumferential groove 135 of the through-wall part 134 that axially overlaps with a radially inner surface of the inner part 130, such that the seal 145 can fluidly seal a leak path at the interface between the inner part 132 and through-wall part 134. To provide fluid communication to the oil/air separator 20a, the through-wall part 134 includes an axial through-passage 165.

As is evident in the illustrated embodiment, the outer part 130, through-wall part 134 and inner part 132 of the fitting 112 are configured to be non-destructively removable and re-installable on the composite vessel 10, which enhances the serviceability of the fitting 112 without affecting the overall integrity of the fitting 112 or composite vessel 10 itself. This is achieved using the non-destructively removable fastener-receiver assemblies 170 which enable coupling and decoupling the respective parts 130, 132, 134 from the composite wall 16. During such servicing, the seal(s) (e.g., 141, 143, 145) may be replaced. In the illustrated embodiment, the respective seals 141, 143, 145 are standard O-ring seals (e.g., elastomeric) housed within the respective seal grooves 131, 133, 135 to surround and seal the through-wall penetration 14a. The use of such standard O-ring seals enhances the repairability of the fitting 112 and minimizes the overall cost to produce and repair the fitting 112 compared to a bespoke gasket design.

Although the exemplary fitting 112 is shown with the exemplary sealing surface arrangement formed by respective seals 141, 143, and 145, it is understood that greater or fewer number of seals may be provided. For example, referring to FIG. 6A, another exemplary embodiment of fitting 112a is shown with an additional outer seal 141b on an opposite side of the fastener-receiver assembly 170 from seal 141. Alternatively or additionally, additional inner seals (not shown) could be provided on an opposite side of the fastener-receiver assembly 170 to seal 143; or additional seals could be provided next to seal 145, for example.

Figure 10:
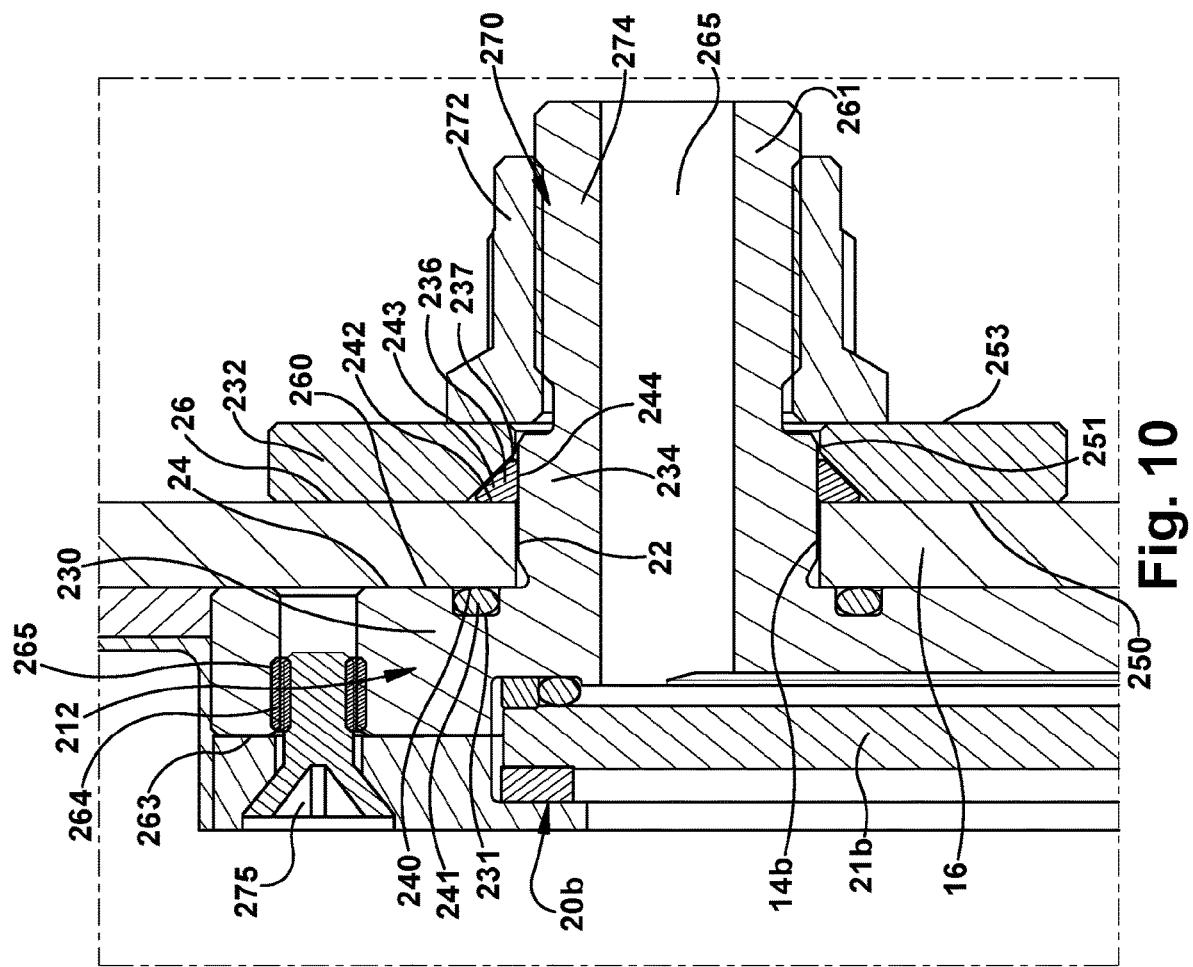
FIG. 10 is an enlarged cross-sectional view of a portion of the fitting shown in FIG. 9.
Figure 9:
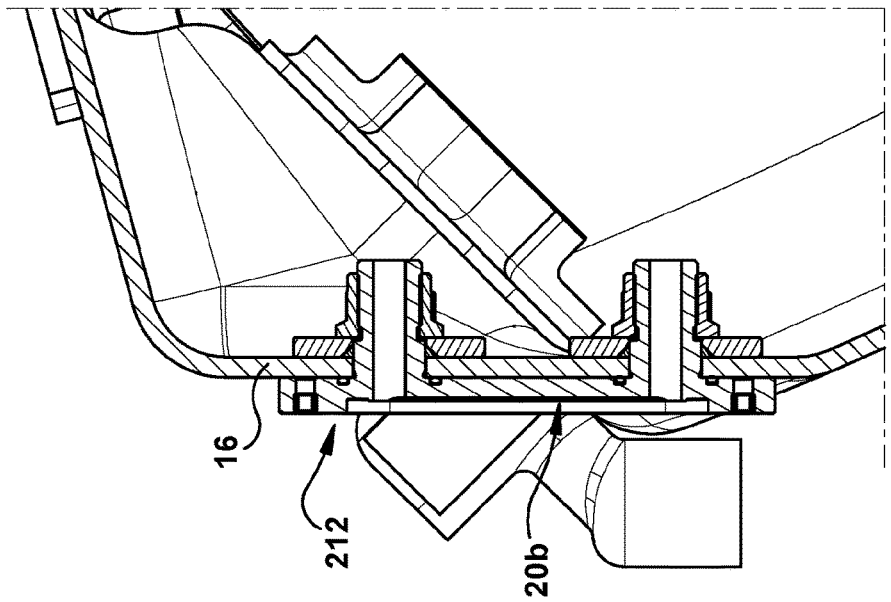
FIG. 9 is a cross-sectional view of a second exemplary fitting and portion of the composite vessel shown in FIG. 1, with the corresponding interfacing component of an exemplary sight gage shown.

Referring to FIGS. 9 and 10, a portion of the composite vessel 10 having through-wall penetration 14b and fitting 212 is shown in further detail. In the illustrated embodiment, the portion of the composite vessel 10 including fitting 212 is configured to interface with sight gage assembly 20b (also shown in FIG. 1). To facilitate alignment and mating of the sight gage assembly 20b (also referred to as sight glass assembly), the through-wall penetration 14b is a post-machined penetration that forms an opening through the composite wall 16, which exposes an end grain 22 of the composite. As such, the exemplary fitting 212 includes structural parts and a unique sealing surface arrangement that cooperate with each other to seal the through-wall penetration 14b against external leakage and exposure of the composite end grain 22 to fluid in the vessel and/or contamination from the external environment.

In the illustrated embodiment, the exemplary structural parts of the fitting 212 include an outer part 230 that overlies at least a portion of an outer surface 24 of the composite vessel, an inner part 232 that overlies at least a portion of an inner surface 26 of the composite vessel, and a through-wall part 234 that extends between the inner part 232 and outer part 230 across the through-wall penetration 14b having the exposed end grain 22. As shown, the exemplary sealing surface arrangement of the fitting 212 includes a first sealing surface 240 that sealingly engages with the outer surface 24 of the composite vessel, a second sealing surface 242 that sealingly engages with the inner surface 26 of the composite vessel, and a third sealing surface 244 that sealingly engages with the through-wall part 234 of the fitting 212 that extends through the penetration 14b. In exemplary embodiments, the structural parts 230, 232, 234 of the fitting 212 generally form a clamp that exerts forces on the opposite outer and inner surfaces 24, 26 of the composite vessel 10, and applies a desired load (e.g., preload) that provides suitable sealing functionality of the sealing surfaces 240, 242, 244. As shown, one or more fastener-receiver assemblies 270 of the fitting 212 may be provided to apply the desired loads for coupling the fitting 212 to the composite wall 16 and for loading the sealing surfaces 240, 242, 244.

The exemplary sealing surface arrangement of the fitting 212 may include an outer seal arrangement and an inner seal arrangement. In the illustrated embodiment, the outer seal arrangement includes at least one outer seal 241 (first seal) having the first sealing surface 240. The outer seal 241 is disposed within an annular face seal groove 231 (first seal housing) of the outer part 230 and fluidly seals against the outer vessel surface 24. The exemplary sealing surface arrangement also includes an inner seal arrangement, which includes at least one inner seal 243 (second seal) in the illustrated embodiment, which this inner seal 243 includes both the second and third sealing surfaces 242, 244 of the sealing surface arrangement. As shown, the inner (second) seal 243 is disposed in a wedge-shaped space 236 (second seal housing) that is formed between respective surfaces of the inner part 232, through-part 234 and vessel inner surface 26. In the illustrated embodiment, the wedge-shaped space 236 (in cross-section) is an annular space that surrounds a radially outer surface of the through-wall part 234 and is at least partially formed by a tapered surface 237, or chamfer, of the inner part 232. The tapered surface 237 faces radially inwardly toward the through-wall part 234, and faces axially outwardly toward the vessel inner surface 26. In this manner, when the seal 243 is loaded via clamping of the fitting 212, the sealing surface 242 sealingly engages against the vessel inner surface 26 to fluidly seal the interface between the inner part 232 and inner surface 26, and the sealing surface 244 sealingly engages against the through-wall part 234 to fluidly seal a leak path or interface between the inner part 232 and through-wall part 234.

The inner part 232 may be formed with a suitable material (e.g., metal, such as titanium or steel; composite; plastic; or the like), which may be made by any suitable process, such as by 3D printing or casting and machining. The inner part 232 includes a first face 250 that abuts the inner surface 26 of the vessel 10. The inner part 232 also forms the tapered surface 237 abutting seal 243. An inner surface 251 forms an opening, such as a central bore, through the inner part 232. The inner part 232 also includes a second face 253 that operatively engages with a part of the fastener-receiver assembly 270 to provide clamping load to the composite wall 16. In the illustrated embodiment, a receiver 272 in the form of a threaded nut (e.g., locking nut) of the fastener-receiver assembly 270 is used to receive a threaded fastener 274 which interact to provide at least a portion of the desired load.

In the illustrated embodiment, the outer part 230 is integral and unitary with the through-wall part 234 to form a single piece structure. This one piece structure may be formed with a suitable metal (e.g., titanium or steel) by any suitable process, such as by 3D printing or casting and machining. In the illustrated embodiment, the outer part 230 includes a first face 260 that abuts the outer surface 24 of the vessel 10. The first face 260 of the outer part 130 includes annular groove 231 that houses seal 241 which surrounds the penetration 14b and seals against the outer surface 24 of the vessel 10. As shown, the outer part 230 includes a plurality of receivers 264 with openings in a second (outer) face 263 that are adapted to receive corresponding fasteners 275 to couple the mating component (e.g., housing 21a of sight glass assembly 20b) to the vessel 10.

The through-wall part 234 is formed as a projection 261 that axially projects from the first face 260 of the outer part 230 and which can be inserted into the opening (bore) of the inner part 232 when the fitting 212 is assembled to the vessel body. As shown in the illustrated embodiment, an end portion of the through-wall part 234 is threaded with radially outward threads to form the fastener 274 of the fastener-receiver assembly 270, which interacts with threads of the receiver 272 to provide and maintain the clamping load. To provide fluid communication to or visualization through a sight glass 21b of the sight-glass assembly 20b, the through-wall part 234 includes an axial through-passage 265.

As is evident in the illustrated embodiment, the outer part 230, through-wall part 234 and inner part 232 of the fitting 212 are configured to be non-destructively removable and re-installable on the composite vessel 10, which enhances the serviceability of the fitting 212 without affecting the overall integrity of the fitting 212 or composite vessel 10 itself. This is achieved using the non-destructively removable fastener-receiver assemblies 270 which enable coupling and decoupling the respective parts 230, 232, 234 from the composite wall 16. During such servicing, the seal(s) (e.g., 241, 243) may be replaced. In the illustrated embodiment, the respective seals 241, 243, are standard O-ring seals (e.g., elastomeric) housed within the respective seal housings 231, 236 to surround and seal the through-wall penetration 14b. The use of such standard seals enhances the repairability of the fitting 212 and minimizes the overall cost to produce and repair the fitting 212 compared to a bespoke gasket design.

Figure 12:
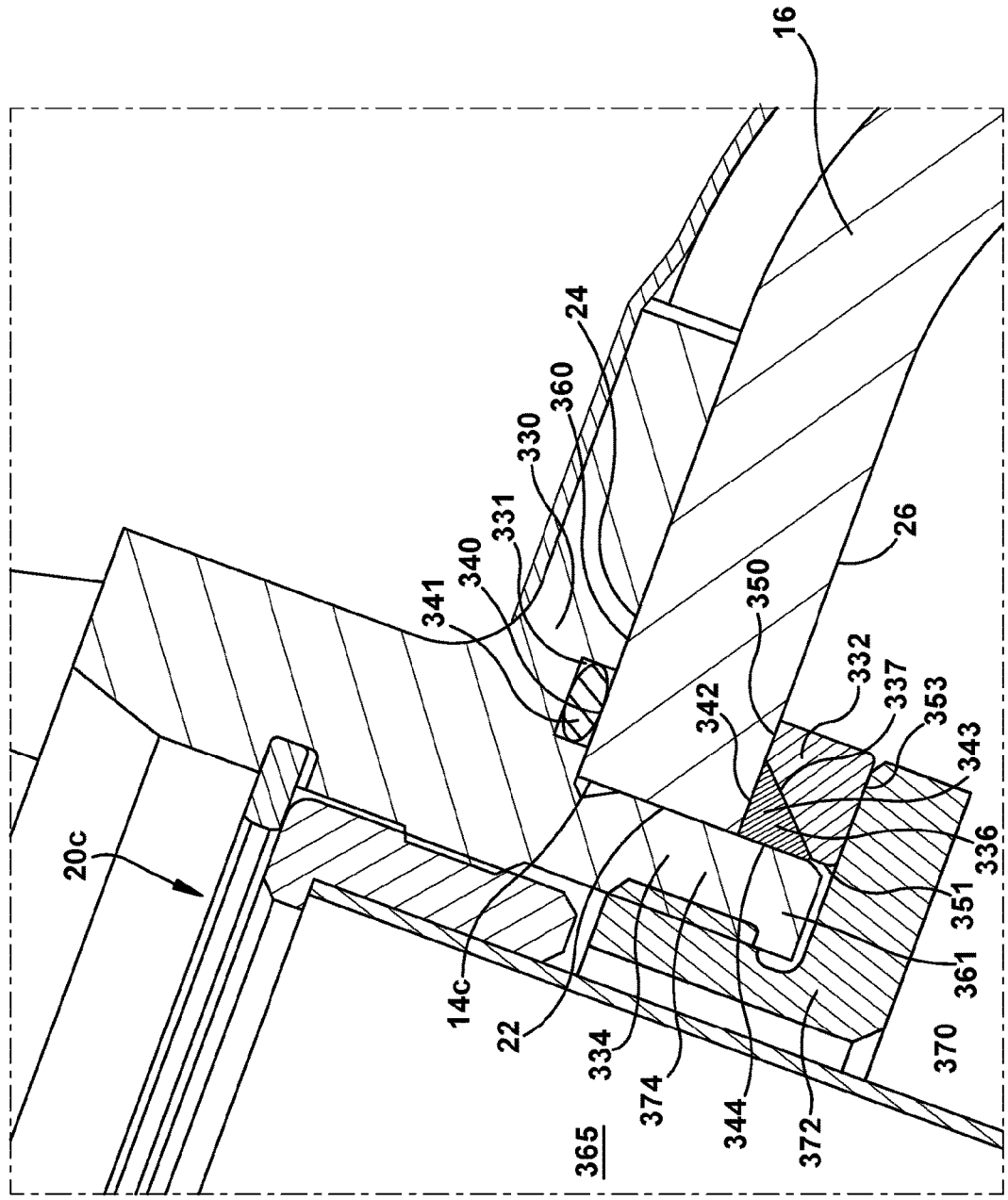
FIG. 12 is an enlarged cross-sectional view of a portion of the fitting shown in FIG. 11.

Referring to FIGS. 11 and 12, a portion of the composite vessel 10 having through-wall penetration 14c and fitting 312 is shown in further detail. In the illustrated embodiment, the portion of the composite vessel 10 including fitting 312 is configured to interface with one of the oil outlets on the bottom of the tank (not shown in FIG. 1). To facilitate alignment and mating of oil strainer with oil outlet port 20c, the through-wall penetration 14c is a post-machined penetration that forms an opening through the composite wall 16, which exposes an end grain 22 of the composite. As such, the exemplary fitting 312 includes structural parts and a unique sealing surface arrangement that cooperate with each other to seal the through-wall penetration 14c against exposure of the composite end grain 22 to fluid in the vessel and/or contamination from the external environment.

In the illustrated embodiment, the exemplary structural parts of the fitting 312 include an outer part 330 that overlies at least a portion of an outer surface 24 of the composite vessel, an inner part 332 that overlies at least a portion of an inner surface 26 of the composite vessel, and a through-wall part 334 that extends between the inner part 332 and outer part 330 across the through-wall penetration 14c having the exposed end grain 22. As shown, the exemplary sealing surface arrangement of the fitting 312 includes a first sealing surface 340 that sealingly engages with the outer surface 24 of the composite vessel, a second sealing surface 342 that sealingly engages with the inner surface 26 of the composite vessel, and a third sealing surface 344 that sealingly engages with the through-wall part 334 of the fitting 312 that extends through the penetration 14c. In exemplary embodiments, the structural parts 330, 332, 334 of the fitting 312 generally form a clamp that exerts forces on the opposite outer and inner surfaces 24, 26 of the composite vessel 10, and applies a desired load (e.g., preload) that provides suitable sealing functionality of the sealing surfaces 340, 342, 344. As shown, one or more fastener-receiver assemblies 370 of the fitting 212 may be provided to apply the desired loads for coupling the fitting 312 to the composite wall 16 and for loading the sealing surfaces 340, 342, 344.

The exemplary sealing surface arrangement of the fitting 312 may include an outer seal arrangement and an inner seal arrangement. In the illustrated embodiment, outer seal arrangement includes at least one outer seal 341 (first seal) having the first sealing surface 340. The outer seal 341 is disposed within an annular face seal groove 331 (first seal housing) of the outer part 330 and fluidly seals against the outer vessel surface 24. The exemplary sealing surface arrangement also includes an inner seal arrangement, which includes at least one inner seal 343 (second seal) in the illustrated embodiment, which this inner seal 343 includes both the second and third sealing surfaces 342, 344 of the sealing surface arrangement. As shown, the inner (second) seal 343 is disposed in a wedge-shaped space 336 (second seal housing) that is formed between respective surfaces of the inner part 332, through-part 334 and vessel inner surface 26. In the illustrated embodiment, the wedge-shaped space 336 (in cross-section) is an annular space that surrounds a radially outer surface of the through-wall part 334 and is at least partially formed by a tapered surface 337, or chamfer, of the inner part 332. The tapered surface 337 faces radially inwardly toward the through-wall part 334, and faces axially outwardly toward the vessel inner surface 26. In this manner, when the seal 343 is loaded via clamping of the fitting 312, or energized (such as via pressurization in the vessel), the sealing surface 342 sealingly engages against the vessel inner surface 26 to fluidly seal the interface between the inner part 332 and inner surface 26, and the sealing surface 344 sealingly engages against the through-wall part 334 to fluidly seal a leak path or interface between the inner part 332 and through-wall part 334.

The inner part 332 may be formed with a suitable material (e.g., metal, such as titanium or steel; composite; plastic; or the like), which may be made by any suitable process, such as by 3D printing or casting and machining. The inner part 332 includes a first face 350 that abuts the inner surface 26 of the vessel 10. The inner part 332 also forms the tapered surface 337 abutting seal 343. An inner surface 351 forms an opening, such as a central bore, through the inner part 332. The inner part 332 also includes a second face 353 that operatively engages with a part of the fastener-receiver assembly 370 to provide clamping load to the composite wall 16. In the illustrated embodiment, a receiver 372 in the form of a threaded nut (e.g., locking nut) of the fastener-receiver assembly 370 is used to receive a threaded fastener 374 which interact to provide at least a portion of the desired load.

In the illustrated embodiment, the outer part 330 is integral and unitary with the through-wall part 334 to form a single piece structure. This one piece structure may be formed with a suitable material (e.g., metal, such as titanium or steel; composite; plastic; or the like), which may be made by any suitable process, such as by 3D printing or casting and machining. In the illustrated embodiment, the outer part 330 includes a first face 360 that abuts the outer surface 24 of the vessel 10. The first face 360 of the outer part 330 includes annular groove 331 that houses seal 341 which surrounds the penetration 14c and seals against the outer surface 24 of the vessel 10. As shown in FIG. 11, the outer part 330 may include one or more receivers 364 with openings in a second (outer) face 363 that are adapted to receive corresponding fasteners (not shown) to couple the mating component (e.g., oil outlet assembly 20c) to the vessel 10. Also as shown, the outer part 330 may include other retaining structures, such as a groove 366 adapted to receive a retaining ring 367 for mounting a screen 21c of the oil outlet assembly 20c.

The through-wall part 334 is formed as a projection 361 that axially projects from the first face 360 of the outer part 330 and which can be inserted into the opening (bore) of the inner part 332 when the fitting 312 is assembled to the vessel body. As shown in the illustrated embodiment, an end portion of the through-wall part 334 is threaded with radially inward threads to form the fastener 374 of the fastener-receiver assembly 370, which interacts with threads of the receiver 372 to provide and maintain the clamping load. To provide fluid communication with the oil outlet assembly 20c, the through-wall part 334 includes an axial through-passage 365.

As is evident in the illustrated embodiment, the outer part 330, through-wall part 334 and inner part 332 of the fitting 312 are configured to be non-destructively removable and re-installable on the composite vessel 10, which enhances the serviceability of the fitting 312 without affecting the overall integrity of the fitting 312 or composite vessel 10 itself. This is achieved using the non-destructively removable fastener-receiver assemblies 370 which enable coupling and decoupling the respective parts 330, 332, 334 from the composite wall 16. During such servicing, the seal(s) (e.g., 341, 343) may be replaced. In the illustrated embodiment, the respective seals 341, 343, are standard O-ring seals (e.g., elastomeric) housed within the respective seal housings 331, 336 to surround and seal the through-wall penetration 14c. The use of such standard O-ring seals enhances the repairability of the fitting 312 and minimizes the overall cost to produce and repair the fitting 312 compared to a bespoke gasket design.

Figure 14:
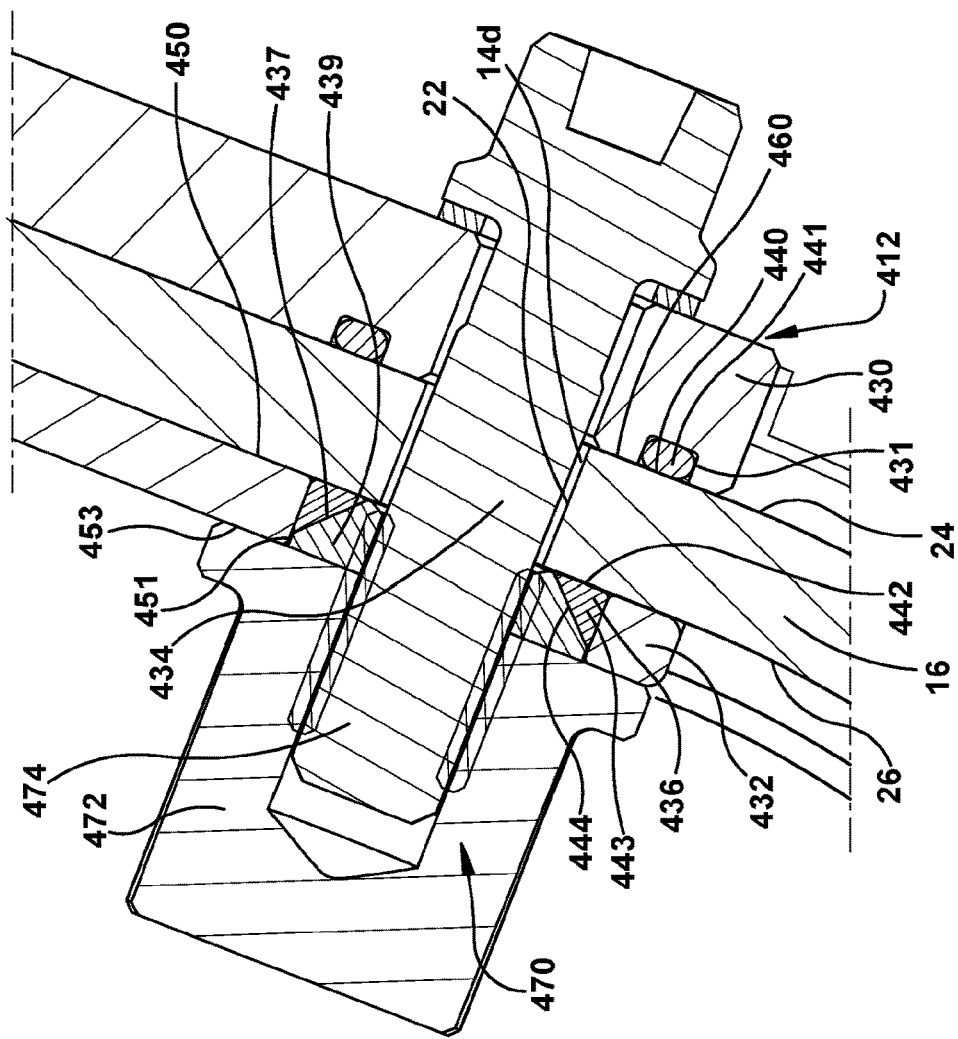
FIG. 14 is an enlarged cross-sectional view of a portion of the fitting shown in FIG. 13.
Figure 13:
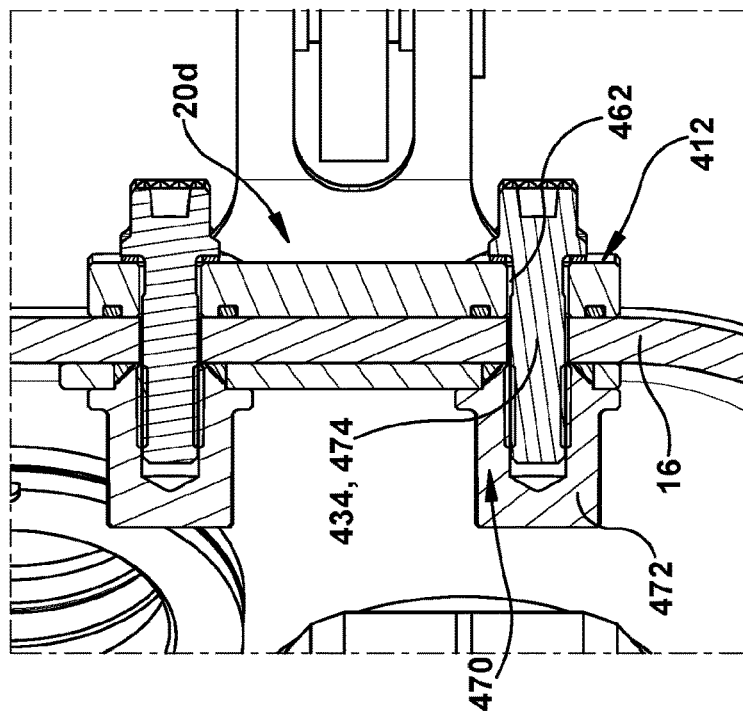
FIG. 13 is a cross-sectional view of a fourth exemplary fitting and portion of the composite vessel shown in FIG. 2, with the corresponding interfacing component of an exemplary mounting clevis shown.

Referring to FIGS. 13 and 14, a portion of the composite vessel 10 having through-wall penetration 14d and fitting 412 is shown in further detail. In the illustrated embodiment, the portion of the composite vessel 10 including fitting 412 is configured to interface with mounting clevis assembly 20d (also shown in FIG. 2). To facilitate alignment and mating of mounting clevis assembly 20d, the through-wall penetration 14d is a post-machined penetration that forms an opening through the composite wall 16, which exposes an end grain 22 of the composite. As such, the exemplary fitting 412 includes structural parts and a unique sealing surface arrangement that cooperate with each other to seal the through-wall penetration 14d against leakage and exposure of the composite end grain 22 to fluid in the vessel and/or contamination from the external environment.

In the illustrated embodiment, the exemplary structural parts of the fitting 412 include an outer part 430 that overlies at least a portion of an outer surface 24 of the composite vessel, an inner part 432 that overlies at least a portion of an inner surface 26 of the composite vessel, and a through-wall part that extends between the inner part 432 and outer part 430 across the through-wall penetration 14d having the exposed end grain 22.

In the illustrated embodiment, the through-wall part is the fastener-receiver assembly 470, which is separate and discrete from both the outer part 430 and the inner part 432. As shown, the fastener-receiver assembly 470 includes at least one fastener 474, such as a bolt, that serves as a projection which axially extends through the penetration 14d from outside to inside the vessel 10. The fastener 474 is received by the receiver 472, such a nut (e.g., locking nut), in which interaction via the respective threads provides and maintains the clamping load. As shown in the illustrated embodiment, the receiver 472 is formed as an acorn nut in which the interior portion forms a blind hole that receives the fastener 474 and encloses the end of the receiver 472 from fluid exposure. The fitting 412 primarily is used as a mount for the mounting clevis 20d, and therefore no axial through-passage for communicating fluid is provided in the through-wall part (fastener-receiver assembly 470).

As shown, the exemplary sealing surface arrangement of the fitting 412 includes a first sealing surface 440 that sealingly engages with the outer surface 24 of the composite vessel, a second sealing surface 442 that sealingly engages with the inner surface 26 of the composite vessel, and a third sealing surface 444 that sealingly engages with the through-wall part (fastener-receiver assembly 470) of the fitting 412 that extends through the penetration 14d. In exemplary embodiments, the structural parts 430, 432, 470 of the fitting 412 generally form a clamp that exerts forces on the opposite outer and inner surfaces 24, 26 of the composite vessel 10, and applies a desired load (e.g., preload) that provides suitable sealing functionality of the sealing surfaces 440, 442, 444. As shown, one or more fastener-receiver assemblies 470 of the fitting 412 may be provided to apply the desired loads for coupling the fitting 412 to the composite wall 16 and for loading the sealing surfaces 440, 442, 444.

The exemplary sealing surface arrangement of the fitting 412 may include an outer seal arrangement and an inner seal arrangement. In the illustrated embodiment, the outer seal arrangement includes at least one outer seal 441 (first seal) having the first sealing surface 440. The outer seal 441 is disposed within an annular face seal groove 431 (first seal housing) of the outer part 430 and fluidly seals against the outer vessel surface 24. The exemplary sealing surface arrangement also includes an inner seal arrangement, which includes at least one inner seal 443 (second seal) in the illustrated embodiment, which this inner seal 343 includes both the second and third sealing surfaces 442, 444 of the sealing surface arrangement. As shown, the inner (second) seal 443 is disposed in a wedge-shaped space 436 (second seal housing) that is formed between respective surfaces of the inner part 432, through-part (fastener-receiver assembly 470) and vessel inner surface 26.

The inner part 432 may be formed with a suitable material (e.g., metal, such as titanium or steel; composite; plastic; or the like), which may be made by any suitable process, such as by 3D printing or casting and machining. The inner part 432 includes a first face 450 that abuts the inner surface 26 of the vessel 10. An inner surface 451 forms an opening, such as a central bore, through the inner part 432. The inner part 432 also includes a second face 453 that operatively engages with a part of the fastener-receiver assembly 470 to provide clamping load to the composite wall 16. In the illustrated embodiment, a receiver 472 in the form of a threaded nut (e.g., locking nut) of the fastener-receiver assembly 470 is used to receive a threaded fastener 474 which interact to provide at least a portion of the desired load.

The outer part 430 may be formed with a suitable material (e.g., metal, such as titanium or steel; composite; plastic; or the like), which may be made by any suitable process, such as by 3D printing or casting and machining. In the illustrated embodiment, the outer part 430 includes a first face 460 that abuts the outer surface 24 of the vessel 10. The first face 460 of the outer part 430 includes annular groove 431 that houses seal 441 which surrounds the penetration 14d and seals against the outer surface 24 of the vessel 10. As best shown in FIG. 13, the outer part 130 includes through-holes 462 with openings in a second (outer) face 163. The through-holes 462 are registered to correspond with the receivers 472 such that the outer part 430 and inner part 432 can assembled to the vessel 10.

The receiver 472 (e.g., nut) forming part of the through-wall part (fastener-receiver assembly 470) also includes a projection 439 at its upper (outward) end which is received into the opening (bore) of the inner part 432 when the fitting 412 is assembled to the vessel body. The projection 439 includes a tapered surface 437, which cooperates with the inner part 432 and vessel inner surface 26 to form the annular wedge-shaped space 436 that houses the inner seal 443. The tapered surface 437 faces radially outwardly toward the inner part 432, and faces axially outwardly toward the vessel inner surface 26. In this manner, when the seal 443 is loaded via clamping of the fitting 412, the sealing surface 442 sealingly engages against the vessel inner surface 26 to fluidly seal the interface between the inner part 432 and inner surface 26, and the sealing surface 444 sealingly engages against the through-wall part (fastener-receiver assembly 470 in the illustrated embodiment) to fluidly seal a leak path or interface between the inner part 432 and through-wall part (fastener-receiver assembly 470). In this manner, the seal is formed between surfaces 437, 444 and 26.

As is evident in the illustrated embodiment, the outer part 430, through-wall part (fastener-receiver assembly 470) and inner part 432 of the fitting 412 are configured to be non-destructively removable and re-installable on the composite vessel 10, which enhances the serviceability of the fitting 412 without affecting the overall integrity of the fitting 412 or composite vessel 10 itself. This is achieved using the non-destructively removable fastener-receiver assemblies 470 which enable coupling and decoupling the respective parts 430, 432, 470 from the composite wall 16. During such servicing, the seal(s) (e.g., 441, 443) may be replaced. In the illustrated embodiment, the respective seals 441, 443, are standard O-ring seals (e.g., elastomeric) housed within the respective seal housings 431, 436 to surround and seal the through-wall penetration 14d. The use of such standard O-ring seals enhances the repairability of the fitting 412 and minimizes the overall cost to produce and repair the fitting 412 compared to a bespoke gasket design.

An exemplary composite vessel and exemplary fittings have been described herein. In the exemplary embodiment(s), the fitting includes a sealing surface arrangement that seals against the composite vessel, protects against leakage of the vessel contents, and protects the end grain from exposure to internal fluid and/or external environment. The fitting includes an outer part, an inner part, and a through-wall part extending between the inner and outer parts across the penetration. An outer seal arrangement includes an outer seal having a first sealing surface that seals against the outer surface of the composite vessel to restrict environmental contaminants migrating to the end grain. An inner seal arrangement includes at least one inner seal having second and third sealing surfaces. The second sealing surface seals against the inner surface of the composite vessel and the third sealing surface seals a leak path or interface between the inner part and through-wall part to restrict internal fluid migrating to the end grain.

At least one advantage of the exemplary fitting(s) includes a fully-sealed adapter for a composite vessel offering protection of the end grain of the laminate at penetrations through the wall of such composite vessel from both environmental and/or fluid contents using conventional O-ring type seals and glands to reduce cost and improve repairability.

At least one other advantage includes a fully-sealed adapter for a composite vessel offering flexibility in manufacturing to finish the interface prior to installation or post-installation to achieve the desired positional tolerance of the finished interface to reduce cost and processing complexity of the composite component.

The concepts provided here are proven capable of withstanding pressure cycling while retaining the ability to easily fabricate and assemble.

According to an aspect, provided is a light-weight composite vessel for containing operating fluid of an aircraft device, such as hydraulic or lubricating oil. The composite vessel may be fabricated from a fiber-reinforced polymer-matrix composite, which has a specific strength comparable to or greater than that of metal, but which can be provided at a much lighter weight than its metal counterpart.

According to another aspect, provided is a unique fitting for a through-wall penetration of a composite fluid vessel that seals against exposure of the composite end grain to fluid in the vessel and/or to the external environment while protecting against leakage of the contents of the vessel. Such a fitting enables penetrations to be fabricated with improved positional accuracy thereby enabling proper alignment with vessel interface components. For example, such positional accuracy may be achieved by conventional machining processes, whereby the end grain becomes exposed, but is thereafter protected by the unique fitting, thereby enabling ease of fabricating such penetrations with improved accuracy and independent from a molding operation.

According to another aspect, the unique fitting disclosed herein is non-destructively removable and preferably re-installable on the composite vessel, thereby enhancing the serviceability of the fitting without affecting the overall integrity of the fitting or composite vessel itself.

According to another aspect, the unique fitting disclosed herein may utilize conventional O-ring seals and gland designs for improving the repairability of the fitting and minimizing overall costs compared to bespoke gasket solutions.

According to another aspect, a composite vessel fitting for a through-wall penetration with an exposed end grain of the composite vessel is provided, the fitting including a sealing surface arrangement configured to seal against the composite vessel and protect the end grain from exposure to internal fluid and/or external environment while preventing leakage of the vessel contents.

Embodiments may include one or more of the following additional features combined with any aspect(s), which these additional features may be added separately or in any suitable combination.

In some embodiments, the fitting forms a clamp configured to exert forces on opposite inner and outer surfaces of the composite vessel.

In some embodiments, the fitting includes: an outer part configured to overlie at least a portion of an outer surface of the composite vessel; an inner part configured to overlie at least a portion of an inner surface of the composite vessel; and a through-wall part configured to extend between the inner and outer parts across the penetration having the exposed end grain.

In some embodiments, the outer part is configured to interface directly against the outer surface of the composite vessel, and the inner part is configured to interface directly against the inner surface of the composite vessel.

In some embodiments, the sealing surface arrangement includes: a first sealing surface configured to interface with an outer surface of the composite vessel and fluidly seal against the outer surface; a second sealing surface configured to interface with an inner surface of the composite vessel and fluidly seal against the inner surface; and a third sealing surface configured to interface and seal against a through-wall part of the fitting, which the through-wall part is configured to extend through the penetration of the composite vessel.

In some embodiments, the sealing surface arrangement includes: an outer seal arrangement including at least one outer seal having the first sealing surface, in which the outer seal arrangement is configured to cooperate with the outer part to fluidly seal against the outer surface for restricting migration of environmental contaminants to the end grain of the composite vessel; and an inner seal arrangement including at least one inner seal having the second and third sealing surfaces, in which the inner seal arrangement configured to cooperate with the inner part and the through-wall part to restrict fluid from the vessel migrating to the end grain of the composite vessel.

In some embodiments, the inner seal arrangement includes a first seal and a second seal that are discrete from each other.

In some embodiments, the first seal is disposed in a seal groove of the inner part, such that the first seal is configured to seal an interface between the inner part and the inner surface of the vessel; and wherein the second seal is disposed in a seal groove of the through-wall part, such that the second seal is configured to seal an interface between the inner part and the through-wall part.

In some embodiments, the inner seal arrangement includes one seal having different portions that form the second and third sealing surfaces.

In some embodiments, the one seal is configured to interface against a tapered surface formed by the through-wall part or the inner part.

In some embodiments, the through-wall part includes a fastener-receiver assembly, and the tapered surface is formed by a receiver of the fastener-receiver assembly.

In some embodiments, the inner part includes a structural backing, and the tapered surface is formed by the inner part.

In some embodiments, the through-wall part includes a fluid passage for communicating fluid flow into or out of the composite vessel.

In some embodiments, the outer part is unitary with the through-wall part.

In some embodiments, the through-wall part projects from the outer part and is configured to extend through the penetration and into an opening formed by the inner part, and wherein the sealing surface arrangement is configured to seal a leak path or interface between the inner part and the through-wall part.

In some embodiments, at least a portion of the through-wall part forms at least a portion of a fastener-receiver assembly that is configured to secure the fitting to the composite vessel.

In some embodiments, at least a portion of the inner part forms at least a portion of a fastener-receiver assembly that is configured to secure the fitting to the composite vessel.

In some embodiments, a receiver of the fastener-receiver assembly includes a blind hole for receiving a fastener.

In some embodiments, the fitting is non-destructively removable from the composite vessel.

In some embodiments, the sealing surface arrangement is devoid of adhesives.

In some embodiments, the sealing surface arrangement includes one or more seals, and wherein all of the one or more seals are O-ring seals.

According to another aspect, a composite vessel includes: a composite wall forming an internal chamber for containing a fluid, the composite wall having at least one through-wall penetration and an exposed end grain at the through-wall penetration; and the composite vessel fitting according to any other aspect secured to the composite wall at the through-wall penetration, in which the sealing surface arrangement of the fitting sealingly engages the composite wall and protects the end grain from exposure to fluid inside of the internal chamber and/or external environment outside of the vessel.

In some embodiments, the composite wall is a fiber-reinforced polymer-matrix composite, and wherein the penetration is a machined penetration that exposes the end grain.

According to another aspect, a composite vessel fitting for a through-wall penetration with an exposed end grain of the composite vessel is provided, the fitting including: an outer part configured to overlie at least a portion of an outer surface of the composite vessel; an inner part configured to overlie at least a portion of an inner surface of the composite vessel; a through-wall part configured to extend between the inner and outer parts across the penetration having the exposed end grain; an outer seal arrangement including at least one outer seal having a first sealing surface, in which the outer seal arrangement is configured to cooperate with the outer part such that the first sealing surface sealingly engages the outer surface of the composite vessel to restrict migration of environmental contaminants to the end grain of the composite vessel; and an inner seal arrangement including at least one inner seal having second and third sealing surfaces, in which the inner seal arrangement is configured to cooperate with the inner part and the through-wall part such that the second sealing surface sealingly engages the inner surface of the composite vessel and the third sealing surface seals a leak path or interface between the inner part and through-wall part, thereby restricting fluid from the vessel migrating to the end grain of the composite vessel.

Embodiments may include one or more of the following additional features combined with any aspect(s), which these additional features may be added separately or in any suitable combination.

In some embodiments, the inner part is configured as a structural backing that is discrete from the outer part and through-wall part, the inner part forming an opening through which the through-wall part extends when the fitting is assembled to the composite vessel.

In some embodiments, all of the seals of the outer seal arrangement and the inner seal arrangement that provide protection to the end grain are O-ring seals.

In some embodiments, further comprising a fastener-receiver assembly configured to secure the fitting to the composite vessel, wherein the fastener-receiver assembly is configured such that the fitting is non-destructively removable from the composite vessel.

According to another aspect, a fitting for a composite vessel includes: an inner portion having a central bore defined by a flanged portion and an inner face for abutting an inner surface of the vessel, the inner portion having an annular groove that houses an annular face seal that abuts and seals against the inner surface of the vessel and a first set of elongate projections adapted to receive fasteners; an outer portion having a cylindrical surface that is telescopically received by the flanged portion and an inner face for abutting an outer surface of the vessel, a first set of through holes registered with the first set of elongate projections, and a first annular groove that houses an annular face seal that abuts and seals against the outer surface of the vessel; and a seal disposed between the flanged portion and the cylindrical portion.

According to another aspect, a method of fabricating a composite vessel for containing a fluid, includes: forming a body of the composite vessel comprising a composite wall that forms an internal chamber for containing fluid; forming a penetration through the composite wall, wherein the forming the penetration exposes an end grain of the composite wall; and securing a fitting to the composite wall at the penetration, wherein the fitting includes a sealing surface arrangement, and wherein the securing the fitting seals the sealing surface arrangement such that the end grain is protected from exposure to internal fluid and/or external environment.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

An "operative connection," or a connection by which entities are "operatively connected," is one in which the entities are connected in such a way that the entities may perform as intended. An operative connection may be a direct connection or an indirect connection in which an intermediate entity or entities cooperate or otherwise are part of the connection or are in between the operably connected entities. An operative connection or coupling may include the entities being integral and unitary with each other.

All ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The transitional words or phrases, such as "comprising," "including," "carrying," "having," "containing," "involving," "holding," or the like, are to be understood to be open-ended, i.e., to mean including but not limited to.

It is to be understood that all ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The transitional words or phrases, such as "comprising," "including," "carrying," "having," "containing," "involving," "holding," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A composite vessel comprising:
   a composite wall forming an internal chamber for containing a fluid, the composite wall having a first through-wall penetration and an exposed end grain at the first through-wall penetration; and
   a composite vessel fitting secured to the composite wall at the first through-wall penetration, the fitting comprising a sealing surface arrangement that seals against the composite vessel and protects the end grain from exposure to internal fluid and external environment while preventing leakage of the contents fluid;
   wherein the fitting is non-destructively removable from the composite vessel,
   wherein the composite wall is a fiber-reinforced polymer-matrix composite,
   wherein the fitting includes a fastener-receiver assembly that forms a clamp that exerts forces on opposite inner and outer surfaces of the composite vessel, and
   wherein the fastener-receiver assembly includes a receiver on an inner side of the composite vessel, the receiver formed on an inner part of the fitting, and a fastener that extends through a second through-wall penetration from an outer side of the composite vessel to engage the receiver on the inner side of the composite vessel,
   wherein the sealing surface arrangement includes:
      an outer seal arrangement including at least one outer seal having a first sealing surface that interfaces with the outer surface of the composite vessel and cooperates with an outer part of the fitting to fluidly seal against the outer surface for restricting migration of environmental contaminants to the end grain of the composite vessel;
      an inner seal arrangement including at least one inner seal including:
      a first seal having a second sealing surface, wherein the first seal is disposed in a seal groove of the inner part of the fitting such that the first seal seals an interface between the inner part and the inner surface of the vessel; and
      a discrete second seal having a third sealing surface that interfaces between the inner part of the fitting and a through-wall part of the fitting wherein the second seal is disposed in a seal groove of the through-wall part, such that the second seal seals an interface between the inner part and the through-wall part, which the through-wall part extends through the first through-wall penetration of the composite vessel.

2. The composite vessel according to claim 1, wherein the fastener is a threaded fastener and the receiver is a threaded receiver.

3. The composite vessel according to claim 1, wherein the fitting includes:
   an outer part that overlies at least a portion of the outer surface of the composite vessel;
   wherein the inner part overlies at least a portion of the inner surface of the composite vessel; and
   wherein the through-wall part extends between the inner and outer parts across the first through-wall penetration having the exposed grain.

4. The composite vessel according to claim 3, wherein the outer part interfaces directly against the outer surface of the composite vessel, and the inner part interfaces directly against the inner surface of the composite vessel.

5. The composite vessel according to claim 3, wherein the through-wall part includes a fluid passage for communicating fluid flow into or out of the composite vessel.

6. The composite vessel according to claim 3, wherein the outer part is unitary with the through-wall part; and
   wherein the through-wall part projects from the outer part and extends through the first through-wall penetration and into an opening formed by the inner part, and
   wherein the sealing surface arrangement seals a leak path or interface between the inner part and the through-wall part.

7. The composite vessel according to claim 1, wherein the sealing surface arrangement is devoid of adhesives.

8. The composite vessel according to claim 1, wherein the sealing surface seals are O-ring seals.

9. A composite vessel comprising:
   a composite wall forming an internal chamber for containing a fluid, the composite wall having at least one through-wall penetration and an exposed end grain at the through-wall penetration; and
   a composite vessel fitting secured to the composite wall at the through-wall penetration, the fitting comprising:
   an outer part that overlies at least a portion of an outer surface of the composite vessel;
   an inner part that overlies at least a portion of an inner surface of the composite vessel;
   a through-wall part that extends between the inner and outer parts across the penetration having the exposed end grain;
   an outer seal arrangement including at least one outer seal having a first sealing surface, in which the outer seal arrangement cooperates with the outer part such that the first sealing surface sealingly engages the outer surface of the composite vessel to restrict migration of environmental contaminants to the end grain of the composite vessel; and
   an inner seal arrangement including at least one inner seal having second and third sealing surfaces, in which the inner seal arrangement cooperates with the inner part and the through-wall part such that the second sealing surface sealingly engages the inner surface of the composite vessel and the third sealing surface seals a leak path or interface between the inner part and through-wall part, thereby restricting fluid from the vessel migrating to the end grain of the composite vessel;
   wherein the inner part, the through-wall part, and the outer part form a fastener-receiver assembly that secures the fitting to the composite vessel with a clamping force that exerts forces on opposite inner and outer surfaces of the composite vessel, wherein the fastener-receiver assembly is configured such that the fitting is non-destructively removable from the composite vessel, wherein the composite wall is a fiber-reinforced polymer-matrix composite, wherein the fastener-receiver assembly includes a receiver formed on the inner part and a fastener that extends through a second through-wall penetration from the outer part to engage the receiver on the inner part of the composite vessel fitting.

10. The composite vessel according to claim 9, wherein the inner part is configured as a structural backing that is discrete from the outer part and through-wall part, the inner part forming an opening through which the through-wall part extends when the fitting is assembled to the composite vessel; or wherein all of the seals of the outer seal arrangement and the inner seal arrangement that provide protection to the end grain are O-ring seals.

\* \* \* \* \*